United States Patent
Wu et al.

(10) Patent No.: US 12,308,483 B2
(45) Date of Patent: May 20, 2025

(54) ELECTROCHEMICAL CELLS COMPRISING THREE-DIMENSIONAL (3D) ELECTRODES INCLUDING A 3D ARCHITECTURED MATERIAL, RELATED SYSTEMS, AND RELATED METHODS OF FORMING HYDROGEN

(71) Applicant: Battelle Energy Alliance, LLC, Idaho Falls, ID (US)

(72) Inventors: Wei Wu, Idaho Falls, ID (US); Dong Ding, Idaho Falls, ID (US); Ting He, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 135 days.

(21) Appl. No.: 16/980,644

(22) PCT Filed: Mar. 11, 2019

(86) PCT No.: PCT/US2019/021611
§ 371 (c)(1),
(2) Date: Sep. 14, 2020

(87) PCT Pub. No.: WO2019/190729
PCT Pub. Date: Oct. 3, 2019

(65) Prior Publication Data
US 2021/0020958 A1   Jan. 21, 2021

Related U.S. Application Data

(60) Provisional application No. 62/649,823, filed on Mar. 29, 2018.

(51) Int. Cl.
*C25B 11/04* (2021.01)
*C25B 1/04* (2021.01)
(Continued)

(52) U.S. Cl.
CPC ............ *H01M 8/0232* (2013.01); *C25B 1/04* (2013.01); *C25B 11/031* (2021.01); *C25B 11/04* (2013.01);
(Continued)

(58) Field of Classification Search
None
See application file for complete search history.

(56) References Cited

U.S. PATENT DOCUMENTS

| 1,913,429 A | 6/1933 | Earl |
| 6,558,839 B2 | 5/2003 | Imhof et al. |

(Continued)

FOREIGN PATENT DOCUMENTS

| CN | 103463984 A | | 12/2013 | |
| KR | 20150111183 A | * | 3/2014 | ............ H01M 8/02 |

(Continued)

OTHER PUBLICATIONS

Choi et al ("Highly efficient and robust cathode materials for low-temperature solid oxide fuel cells: PrBa0.5Sr0.5Co2-xFexO5+σ", Scientific Reports, 3: 2426, pp. 1-6). (Year: 2013).*

(Continued)

*Primary Examiner* — Alexander W Keeling
(74) *Attorney, Agent, or Firm* — TraskBritt

(57) ABSTRACT

An electrochemical cell comprising a three-dimensional (3D) electrode, another electrode, and an electrolyte. The 3D electrode comprises a 3D architectured material. Methods of forming the 3D architectured material are also disclosed, as are methods of using the 3D architectured material in methods of forming hydrogen.

20 Claims, 9 Drawing Sheets

(51) Int. Cl.
| | |
|---|---|
| C25B 11/031 | (2021.01) |
| H01M 4/52 | (2010.01) |
| H01M 4/86 | (2006.01) |
| H01M 4/90 | (2006.01) |
| H01M 8/0232 | (2016.01) |
| H01M 8/1246 | (2016.01) |
| H01M 8/12 | (2016.01) |

(52) U.S. Cl.
CPC .......... H01M 4/52 (2013.01); H01M 4/8621 (2013.01); H01M 4/9033 (2013.01); H01M 8/1246 (2013.01); *H01M 2008/1293* (2013.01)

(56) References Cited

U.S. PATENT DOCUMENTS

| | | | |
|---|---|---|---|
| 6,632,570 | B2 | 10/2003 | Imhof et al. |
| 2007/0278092 | A1 | 12/2007 | Irvine et al. |
| 2011/0114496 | A1 | 5/2011 | Dopp et al. |
| 2014/0314948 | A1 | 10/2014 | Braun et al. |
| 2016/0049662 | A1 | 2/2016 | Kim et al. |
| 2016/0272502 | A1 | 9/2016 | Zhu et al. |
| 2019/0173096 | A1* | 6/2019 | Liu .................... H01M 8/0637 |

FOREIGN PATENT DOCUMENTS

| | | |
|---|---|---|
| RU | 2208000 C1 | 2/2002 |
| WO | WO-2013048722 A1 * 4/2013 | .............. C04B 35/50 |

OTHER PUBLICATIONS

Zhang et al ("Facile Synthesis of Heterostructured Nickel/Nickel Oxide Wrapped Carbon Fiber: Flexible Bifunctional Gas-Evolving Electrode for Highly Efficient Overall Water Splitting", ACS Sustainable Chem. Eng. 2017, 5, 1, pp. 529-536). (Year: 2017).*

Joo et al ("Ordered nanoporous arrays of carbon supporting high dispersions of platinum nanoparticles", Nature, vol. 412, 2001, pp. 169-172). (Year: 2001).*

Hu et al ("Earth-abundant carbon catalysts for renewable generation of clean energy from sunlight and water", Nano Energy, vol. 41, 2017, pp. 367-376). (Year: 2017).*

Lessing ("Materials for hydrogen generation via water electrolysis", Journal of Materials Science, vol. 42, 2007, pp. 3477-3487) (Year: 2007).*

Kim et al ("Hybrid-solid oxide electrolysis cell: A new strategy for efficient hydrogen production", Nano Energy, 44, Feb. 2018, pp. 121-126) (Year: 2018).*

Zhao et al ("A flexible carbon electrode based on traditional cotton woven fabrics with excellent capacitance", J Mater Sci (2017) 52: 9773-9779) (Year: 2017).*

Dong et al ("Eggshell membrane-templated synthesis of highly crystalline perovskite ceramics for solid oxide fuel cells", J. Mater. Chem., 2011, 21, pp. 1028-1032). (Year: 2011).*

Meng et al ("Highly compact and robust hollow fiber solid oxide cells for flexible power generation and gas production", Applied Energy, 205 (2017) 741-748). (Year: 2017).*

Ding et al ("Electrochemical performance of $BaZr_{0.1}Ce_{0.7}Y_{0.1}Yb_{0.1}O_3$-$\sigma$ electrolyte based proton-conducting SOFC solid oxide fuel cell with layered perovskite $PrBaCo_2O_5$+$\sigma$ cathode", Journal of Power Sources, 196 (2011) 2602-2607). (Year: 2011).*

Mermelstein et al ("Development and Demonstration of a Novel Reversible SOFC System for Utility and Micro Grid Energy Storage", Fuel Cells, 17, 2017, No. 4, 562-570). (Year: 2017).*

Lund et al ("Application of dye-sensitized and perovskite solar cells on flexible substrates", Flex. Print. Electron. 3, Mar. 1, 2018, 013002). (Year: 2018).*

Bi et al., "Y-doped $BaZrO_3$ as a chemically stable electrolyte for proton-conducting solid oxide electrolysis cells (SOECs)", J. Mater. Chem A., (2015), vol. 3, pp. 5815-5819.

Chen et al., "Heirarchically Oriented Macroporous Anode-Supported Solid Oxide Fuel Cell with Thin Ceria Electrolyte Film", ACS Appl. Mater. Interfaces 2014, vol. 6, pp. 5130-5136.

Choi et al., "Highly efficient and robust cathode materials for low-temperature solid oxide fuel cells: $PrBa_{0.5}Sr_{0.5}Co_{2-x}Fe_xO_{5+\delta}$", Scientific Reports, vol. 3: 2426, pp. 1-6.

Gan et al., "A scandium-doped manganate anode for a proton-conducting solid oxide steam electrolyzer", RSC Adv, 2016, vol. 6, pp. 641-647.

Gan et al., "Composite Oxygen Electrode Based on LSCM for Steam Electrolysis in a Proton Conducting Solid Oxide Elecrtolyzer", Journal of the Electrochemical Society, vol. 159 (11), (2012), pp. F763-F767.

He et al., Electrode performance and analysis of reversible solid oxide fuel cells with proton conducting electrolyte of $BaCe_{0.5}ZR_{0.3}Y_{0.2}O_{3-\delta}$, Elsevier, Journal of Power Sources, vol. 195, (2010) pp. 3359-3364.

Heidari et al., "Optimization of BSCF-SDC composite air electrode for intermediate temperature solid oxide electrolyzer cell", Elsevier, Energy Conversion and Management, vol. 136 (2017), pp. 78-84.

International Search Report and Written Opinion received for PCT Patent Application No. PCT/US19/21611, mailed on Jul. 23, 2019, 10 pages.

Kim et al., "Hybrid-solid oxide electrolysis cell: A new strategy for efficient hydrogen production", Elsevier, Nano Energy, vol. 44 (2018), pp. 121-126.

Li et al., "Composite manganate oxygen electrode enhanced with iron oxide nanocatalyst for high temperature steam electrolysis in a proton-conducting solid oxide electrolyzer", Elsevier, ScienceDirect, International Journey of Hydrogen Energy, vol. 40, (2015), pp. 7920-7931.

Wu et al., "A High-Performing Direct Carbon Fuel Cell with a 3D Architectured Anode Operated Below 600C." Advanced Materials 30.4, Jan. 2018 (Jan. 2018): 1704745, p. 1,3; Fig 1,2,5 [online] URL <https://www.osti.gov/pages/servlets/purl/1476801>.

Wu et al., Development of High Performance Intermediate Temperature Proton-conducting Solid Oxide Electrolysis Cells, ECS Transactions, vol. 80, (2017), pp. 167-173.

Lee et al., "Stitchable Organic Photovoltaic Cells with Textile Electrodes", ScienceDirect, Nano Energy, vol. 9, 2014, 6 pages.

Lv et al., "Nanocarbon-Based Materials for Flexible All-Solid-State Supercapacitors", Advanced Materials, 2018, 30, 17 pages.

Yang et al., "Nanofibrous Smart Fabrics from Twisted Yarns of Electrospun Piezopolymer", Applied Materials & Interfaces, vol. 9, 2017, 10 pages.

* cited by examiner

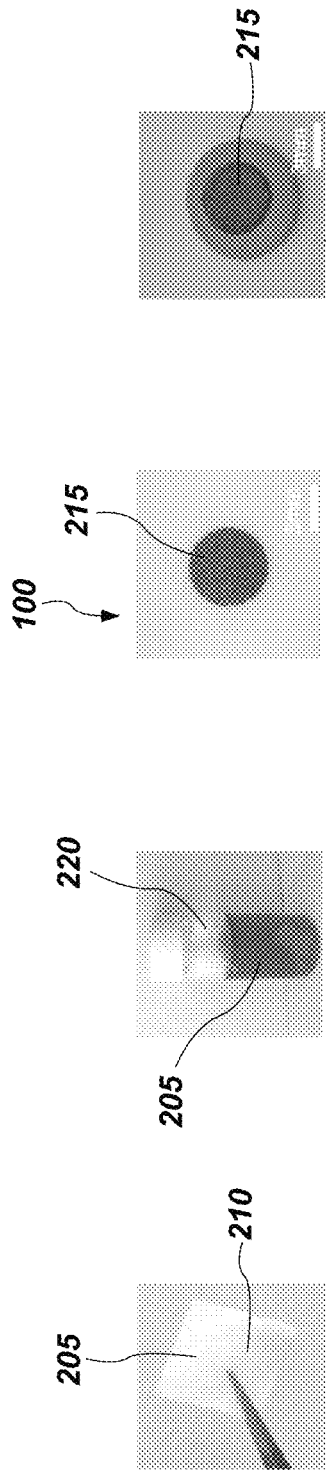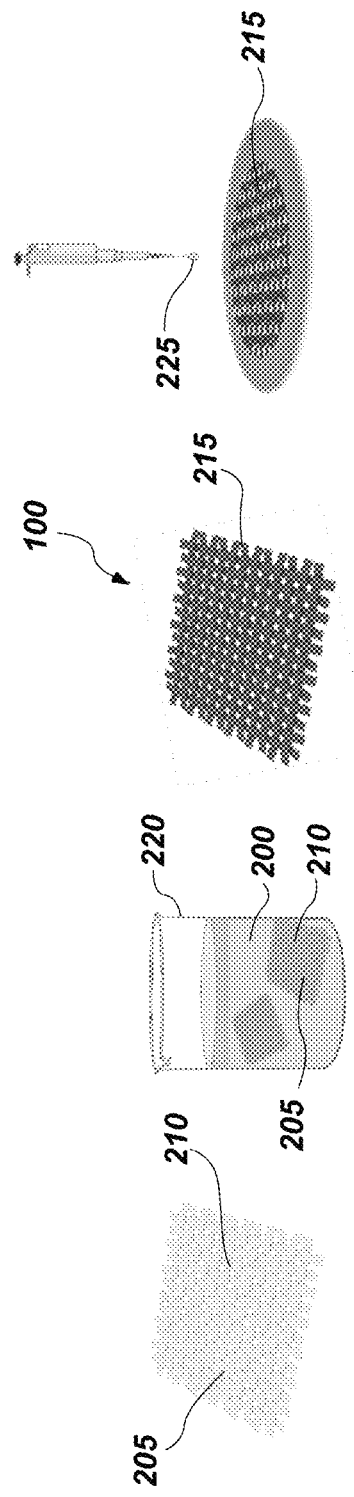

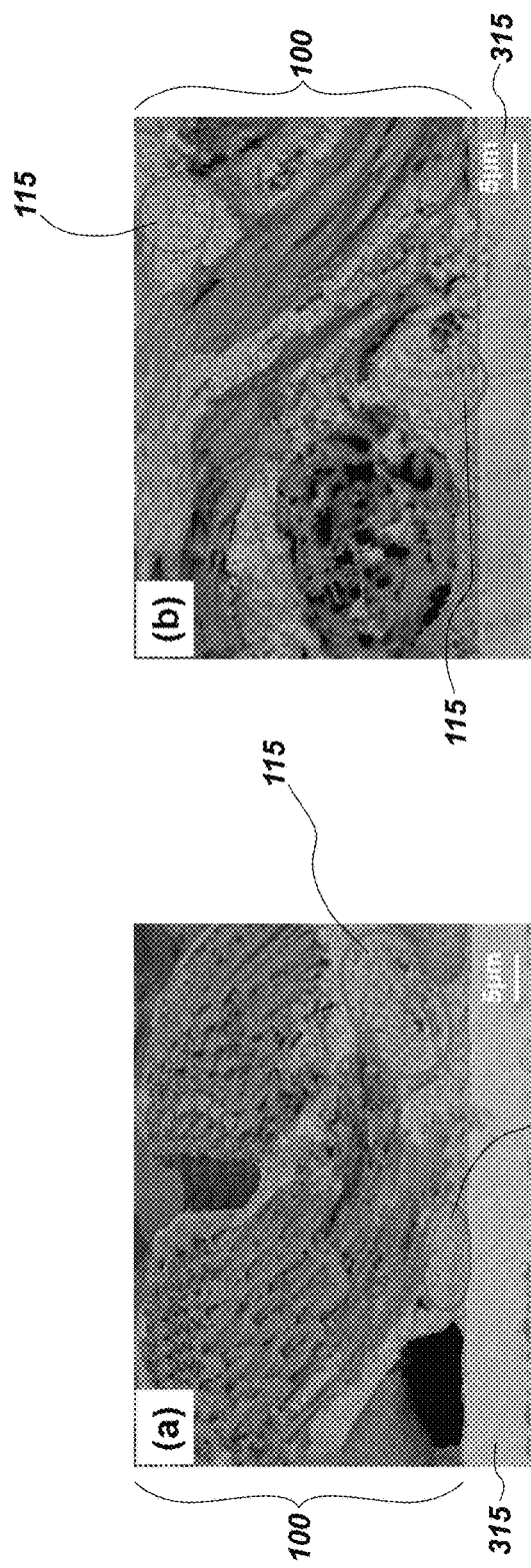
FIG. 10a
FIG. 10b
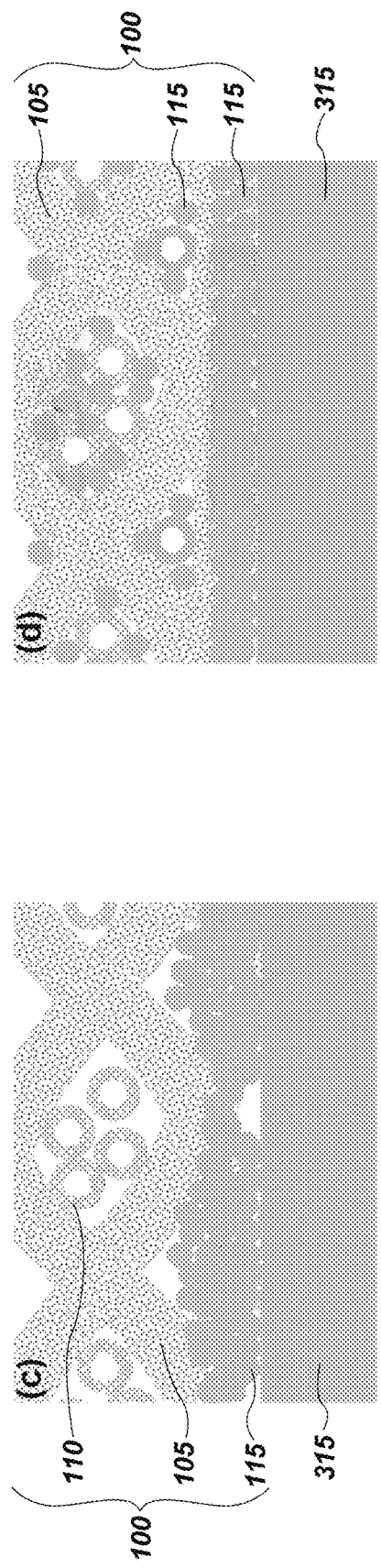
FIG. 10c
FIG. 10d

ELECTROCHEMICAL CELLS COMPRISING THREE-DIMENSIONAL (3D) ELECTRODES INCLUDING A 3D ARCHITECTURED MATERIAL, RELATED SYSTEMS, AND RELATED METHODS OF FORMING HYDROGEN

CROSS-REFERENCE TO RELATED APPLICATIONS

This application is a national phase entry under 35 U.S.C. § 371 of International Patent Application PCT/US2019/021611, filed Mar. 11, 2019, designating the United States of America and published as International Patent Publication WO 2019/190729 A1 on Oct. 3, 2019, which claims the benefit of the filing date of U.S. Provisional Patent Application Ser. No. 62/649,823, filed Mar. 29, 2018, for "ELECTROCHEMICAL CELLS COMPRISING THREE-DIMENSIONAL (3D) ELECTRODES INCLUDING A 3D ARCHITECTURED MATERIAL, METHODS FOR FORMING THE 3D ARCHITECTURED MATERIAL, AND RELATED METHODS OF FORMING HYDROGEN."

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

Embodiments of the disclosure relate to methods and systems for producing hydrogen gas through water electrolysis, and to related electrochemical cells and electrolysis systems including the electrochemical cells.

BACKGROUND

Renewable and sustainable energies have gained intensive attention worldwide during the past decades, as the consumption of carbon-based fuels, such as fossil fuels, causes serious environmental issues. The sustainable supply of clean energy is a global challenge and a viable solution is to use alternative energy derived from renewable resources that do not harm the environment. However, commercialization of many renewable energy technologies is hindered by their low efficiency and high cost. Hydrogen, one of the most abundant elements in the earth, is regarded as the cleanest fuel that has great potential to replace the carbon-based fuels. Consequently, efficient production of hydrogen is crucial to the hydrogen economy. Hydrogen production via water electrolysis using solid oxide electrolysis cells (SOECs) has attracted considerable attention because of its favorable thermodynamics and kinetics. It is considered an efficient and low-cost option for hydrogen production from renewable energies. At present, most hydrogen is produced from steam reforming of fossil fuels ((steam methane reforming (SMR)), which is a mature technique due to its operational reliability and low cost of methane since the shale gas revolution. However, SMR is neither sustainable nor eco-friendly, since the fossil fuels are not renewable and the exhausts (e.g., $CO_2$ and $SO_2$) are threats to the environment. Water (e.g., steam) electrolysis using solid oxide electrolysis cells (SOECs) is a viable alternative to SMR owing to its very high cost scaling factors and clean products. However, SOECs using oxygen ion conductors (O-SOECs) are operated at a high temperature, such as a temperature of greater than 850° C., to enable reasonable cell performance. The high temperature causes problems with degradation, sealing, and poor start-up and thermal cycling. SOECs using proton ion conductors (P-SOECs) are operated at a lower temperature. However, the P-SOECs have poor performance at the lower temperature with slow electrode kinetics and instability.

BRIEF SUMMARY

An electrochemical cell is disclosed and comprises a three-dimensional (3D) electrode comprising a 3D architectured material, another electrode, and an electrolyte between the 3D electrode and the another electrode is disclosed.

A method of forming a 3D architectured material is also disclosed. The method comprises contacting a fabric textile with a precursor solution comprising at least one metal salt. The at least one metal salt is absorbed to the fabric textile. The at least one metal salt in the fabric textile is converted to at least one metal oxide to form a 3D architectured material comprising the at least one metal oxide.

Also disclosed is a system comprising at least one steam generator and at least one electrolysis apparatus in fluid communication with the at least one steam generator. The at least one electrolysis apparatus comprises at least one electrochemical cell, which comprises a 3D electrode comprising a 3D architectured material, an electrolyte adjacent the 3D electrode, and another electrode adjacent the electrolyte. A power source is electrically connected to the at least one electrochemical cell.

A method of forming hydrogen is also disclosed. Water is introduced to an electrochemical cell that comprises a 3D architectured material, another electrode, and an electrolyte between the 3D electrode and the another electrode at a temperature of less than or equal to about 600° C. A potential difference is applied between the 3D electrode and the another electrode, and the water is decomposed into oxygen gas and hydrogen gas.

BRIEF DESCRIPTION OF THE DRAWINGS

FIGS. 2a1-2d2 are photographs (FIGS. 2a1, 2b1, 2c1, 2d1) and schematic illustrations (FIGS. 2a2, 2b2, 2c2, 2d2) showing a process of forming the 3D architectured material according to embodiments of the disclosure.

FIGS. 10a and 10b are cross-sectional SEM images of an electrochemical cell including the 3D architectured material according to embodiments of the disclosure as a 3D electrode before (FIG. 10a) and after (FIG. 10b) steam electrolysis, and FIGS. 10c and 10d are schematic illustrations showing the interface between an electrolyte and the 3D electrode before (FIG. 10c) and after (FIG. 10d) electrolysis.

DETAILED DESCRIPTION

Figure 1A:
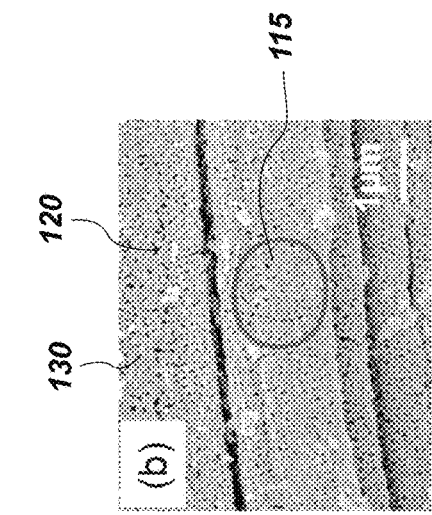
FIGS. 1a-1d are high magnitude scanning electron micrograph (SEM) and high-angle annular dark-field (HAADF) scanning transmission electron microscopy (STEM) images of a three-dimensional (3D) architectured material according to embodiments of the disclosure.

A three-dimensional (3D) architectured material, an article (e.g., an electrode) formed from the 3D architecture material, a system including an electrochemical cell including the article, methods of forming the 3D architectured material, and methods of forming hydrogen using the 3D architecture material are disclosed. The 3D architectured material is porous and exhibits an aligned microstructure that provides mass transfer pathways for molecules, such as water or protons. The aligned microstructure of the 3D architectured material also provides mechanical strength and flexibility to the 3D architectured material, enabling mass production of the article from the 3D architectured material. The 3D architectured material includes a fibrous frame of fibers and metal oxide particles and is formed from a precursor solution by a soak and anneal (e.g., sinter) process. The 3D architectured material is formed by ion absorption of metal salts and subsequent thermal treatment of the metal salts to produce metal oxides. The metal oxides of the metal oxide particles are selected to produce hydrogen from water by the water (e.g., steam) electrolysis reaction. The 3D architectured material is formed from a precursor solution including the metal salts and is annealed (e.g., sintered) to form a ceramic material including the metal oxides. The 3D architectured material is formed by a simple process and is easily integrated into the article. The article may be a 3D ceramic article, such as a 3D electrode. The 3D electrode may be a self-architectured ultra-porous (SAUP) 3D steam electrode that includes hollow PBSCF fibers. The article may be used in, for example, an electrochemical cell (e.g., a fuel cell, a SOEC), another energy storage device (e.g., a battery), an electronic device (e.g., a supercapacitor), an energy storage device (e.g., a battery), an electrolyzer, or in petrochemical applications. In some embodiments, the article including the 3D architectured material is an electrode of an electrochemical cell and is used in an electrolysis system configured to produce hydrogen gas ($H_2(g)$) through water electrolysis.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying this disclosure are for illustrative purposes only, and are not meant to be actual views of any particular material, device, or system.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, and arrangement of one or more of at least one structure and at least one system facilitating operation of one or more of the structure and the system in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "electrode" means and includes an electrode having a relatively lower electrode potential in an electrochemical cell (i.e., lower than the electrode potential in a positive electrode therein) or an electrode having a relatively higher electrode potential in an electrochemical cell (i.e., higher than the electrode potential in a negative electrode therein).

As used herein the term "electrolyte" means and includes an ionic conductor, which can be in a solid state, a liquid state, or a gas state (e.g., plasma).

As used herein, the term "compatible" means that a material does not undesirably react, decompose, or absorb another material, and also that the material does not undesirably impair the chemical and/or mechanical properties of the another material.

As shown in FIGS. 1a-1d, the 3D architectured material 100 includes a frame 105 (e.g., a fibrous frame) including bundles of fibers 110, metal oxide particles 115 (within circled regions), and pores 120 in walls of the fibers 110. The fibrous frame 105 (e.g., 3D framework) provides sufficient mechanical strength and flexibility for the 3D architectured material 100 to be processed and integrated into the article, such as an electrochemical cell 300 (see FIG. 3). Openings 125 in the fibers 110 of the 3D architectured material 100 are parallel to a longitudinal axis of the fibers 110 and extend a length of the fibers 110. The fibers 110 of the 3D architectured electrode 305 are, thus, hollow. The pores 120 in the fibers 110 are distributed along the fiber walls 130. The pores 120 are nanosized and uniformly (e.g., evenly) distributed throughout the fiber walls 130. The pores 120 provide an increased surface area to the fibers 110. The openings 125 and the pores 120 enable fast mass transfer of molecules (e.g., ions), such as water or protons, through the fibers 110. The hollow fibers 110 have an average diameter of from about 3 μm to about 4 μm with a pore size of 1 μm, exhibiting good strength and suppleness, compared to electrospinning-derived fibers. The hollow fibers 110 provide reaction sites for the metal oxide particles 115 to react with water and produce hydrogen. The metal oxides of the metal oxide particles 115 function as a catalyst to increase the reaction rate of the water electrolysis (the production of hydrogen from water, such as steam). The metal oxide particles 115 includes oxides of two or more of a rare earth metal, an alkaline earth metal, a transition metal, a lanthanide, or combinations thereof. The metal oxide particles 115 may be nano-sized (e.g., individually having a cross-sectional width or diameter less than about one (1) μm, such as less than or equal to about 100 nanometers (nm), less than or equal to about 20 nm, or less than or equal to about 10 nm).

Figure 1B:
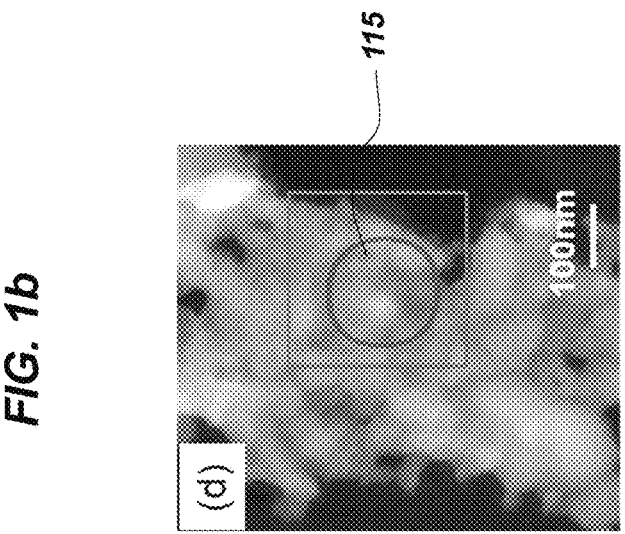
Figure 1C:
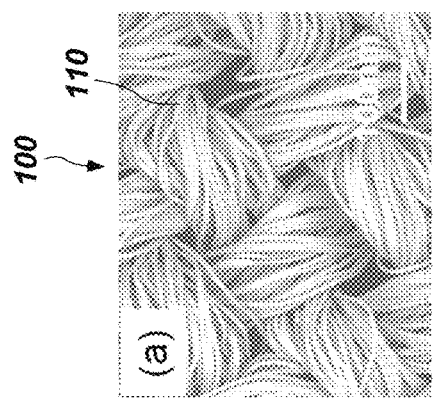
Figure 1D:
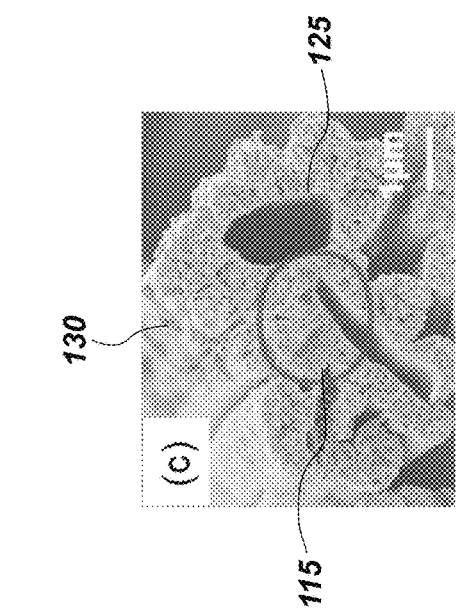

The 3D architectured material 100 includes, after annealing (e.g., calcination), the bundles of the fibers 110, as shown in FIG. 1a. As shown in FIG. 1b, which is an enlarged view of the fibers 110 in FIG. 1a, the fibers 110 include substantially uniformly (e.g., substantially evenly) distributed pores 120 in the walls. As shown in FIG. 1c, which is a cross-sectional view of the fibers 110, the fibers 110 of the 3D architectured material 100 include the openings 125 and are hollow, with an average inner diameter of the openings 125 of from about 0.5 μm to about 2.5 such as from about 1 μm to about 2 μm. The size of the openings 125 is sufficiently large to enable molecules, such as water, to move through the fibers 110 at operating temperature. A portion of a single fiber 110 is shown in FIG. 1d by high-angle annular dark-field (HAADF) scanning transmission electron microscopy (STEM). Electron energy-loss spectroscopy (EELS) mapping (not shown) of the area marked in FIG. 1d was conducted and showed that all of the elements (e.g., Pr, Ba, Sr, Co, Fe) of the fibers 110 are relatively uniform distributed.

The 3D architectured material 100 is fabricated by the soak and anneal process, as shown in FIGS. 2a1-2d2. A precursor solution 200 of the metal salts is prepared by dissolving stoichiometric amounts of metal salts (e.g., metal nitrate salts) in a solvent (e.g., distilled water). The metal salt may include a salt of a rare earth metal, an alkaline earth metal, a transition metal, a lanthanide, or combinations thereof, such as a salt of barium, cerium, cobalt, iron, neodymium, praseodymium, samarium, strontium, zirconium, or combinations thereof. Nitrate salts of the metals may be commercially available. As shown in FIGS. 2a1, 2a2, 2b1, and 2b2, a fabric textile 205 is cut into a coupon 210 having a desired shape and immersed in the precursor solution 200 for an amount of time sufficient to absorb the metal salts, such as from about 1 hour to about 24 hours or from about 5 hours to about 12 hours. The fabric textile 205 may be a low cost, carbon-based fabric, such as a cotton fabric. By way of example only, the fabric textile 205 may be commercially available from Telio (Montreal, Canada). The coupon 210 may be sized such that the coupon 210 is able to be substantially completely submerged in a vessel 220 containing the precursor solution 200. The coupon 210 may be subjected to an absorption act to absorb the metal salt into the fabric textile 205. The size of the coupon 210 may also be sufficient to fit into a heater (e.g., a furnace) (not shown) for annealing (e.g., sintering). The fabric textile 205 including the absorbed metal salts may be moved to the heater and heated to an appropriate temperature for an amount of time sufficient to ceramify (e.g., sinter, calcine) the metal salts and form the 3D architectured material 100 including the metal oxide particles 115. The fabric textile 205 including the absorbed metal salts is, thus, subjected to a calcination act. The 3D architectured material 100 including the metal oxide particles 115 may be subjected to heat for an amount of time sufficient to convert the metal salts to metal oxides. By way of example only, the 3D architectured material 100 may be exposed to heat at a temperature of from about 500° C. to about 1000° C., such as from about 600° C. to about 900° C., for from about 30 minutes to about 8 hours, such as from about 1 hour to about 5 hours. The fabric textile 205 is, thus, converted to a ceramic textile 215 including the 3D architectured material 100. By using the fabric textile 205, the ceramic textile 215 may be produced at a low cost. The 3D architectured material 100 may be formed into a desired shape suitable for integration into a desired article. By way of example only, and as shown in FIGS. 2c1 and 2c2, the 3D architectured material 100 may be formed into a circular shape, such as by using a punch tool, e.g., a round punch type tool. The 3D architectured material 100 may exhibit sufficient strength and flexibility to be formed into the desired shape without damaging the 3D architectured material 100. As shown in FIGS. 2d1 and 2d2, the 3D architectured material 100 may be bonded to a surface of a component of the electrochemical cell 300 of system 400 (see FIG. 4), such as a surface of electrolyte 315 (see FIG. 3) of the electrochemical cell 300. The 3D architectured material 100 may, thus, be subjected to a bonding act. By way of example only, the 3D architectured material 100 may be bonded to the electrolyte 315 using a bonding agent 225, such as a polyvinyl butyral (PVB)/PBSCF suspension. The 3D architectured material 100 may be further modified by forming (e.g., coating) one or more of a catalyst or an electrocatalyst on the 3D architectured material 100 through techniques like wet infiltration/impregnation, PVD, or CVD.

Figure 3:
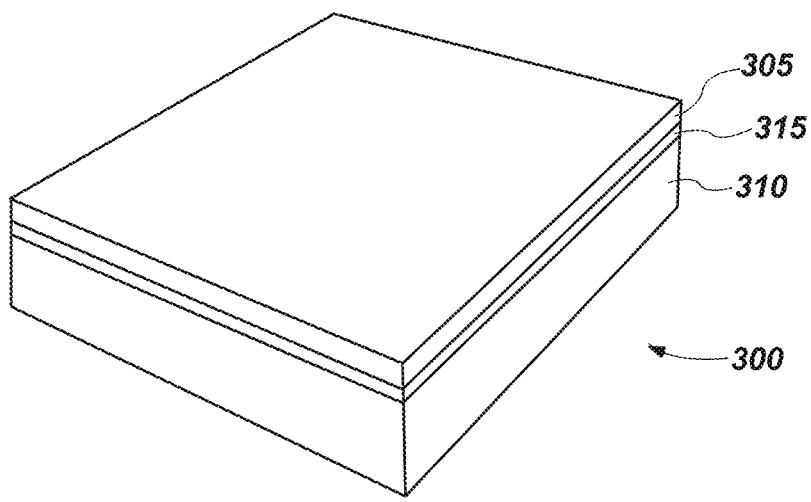
FIG. 3 is a schematic illustration of an electrochemical cell including the 3D architectured material according to embodiments of the disclosure.

The 3D architectured material 100 may be incorporated into the system 400 as at least a portion of the article. By way of example only, the 3D architectured material 100 may be configured as the electrode 305 of the electrochemical cell 300 and the system 400 may include the electrochemical cell 300 (e.g., a fuel cell, a SOEC) configured to conduct the water (e.g., steam) electrolysis reaction to produce hydrogen. As shown in FIG. 3, the electrochemical cell 300 may include two electrodes 305, 310 and an electrolyte 315 between the electrodes 305, 310. The 3D architectured material 100 may be bonded to the surface of the electrolyte 315. The 3D architectured material 100 may be used as the material for a first electrode 305, which may also be referred to herein as a steam electrode, an oxygen electrode, a 3D electrode, a 3D steam electrode, a 3D architectured PBSCF steam electrode, or a positive electrode (e.g., cathode). The second electrode 310 may be referred to herein as a hydrogen electrode, a porous hydrogen electrode, a Ni-BZCYYb electrode, or a negative electrode (e.g., anode). The aligned microstructure of the 3D electrode 305 (i.e., the first electrode) may provide mass transfer pathways for molecules, such as water or protons. Good adhesion between the electrolyte 315 and the 3D electrode 305 may be observed, with an interface between the electrolyte 315 and the 3D electrode 305 showing good contact and little or no cracks or disconnections when adhered to the electrolyte 315. The porosity of the 3D electrode 305 may provide enhanced fast water transfer within the electrochemical cell 300 and improved electrolysis performance. The porosity, hollow fibers 110, and organized morphology of the 3D electrode 305 may also enable a catalyst (not shown) to be incorporated into the 3D architectured material 100, forming a composite. The catalyst, if present, may be selected depending on the intended use of the 3D architectured material 100. In comparison, conventional electrode materials and configurations are not able to incorporate catalysts due to their low porosity and random morphology.

The hydrogen electrode 310 (i.e., the second electrode) and the electrolyte 315 of the electrochemical cell 300 may be formed from conventional materials and are of conventional configurations to conduct, for example, the water electrolysis. The materials may be selected to facilitate the production of $H_2$ from water and to be compatible with one another and with the material of the 3D electrode 305. The material of the hydrogen electrode 310 may include, but is not limited to, a double perovskite material, such as $MBa_{1-x}Sr_xCo_{2-y}Fe_yO_{5+\delta}$, wherein x and y are dopant levels, $\delta$ is the oxygen deficit, and M is Pr, Nd, or Sm (e.g., $PrBa_{0.5}Sr_{0.5}Co_{1.5}Fe_{0.5}O_{5+\delta}$ (PBSCF), $NdBa_{0.5}Sr_{0.5}Co_{1.5}Fe_{0.5}O_{5+\delta}$, $SmBa_{0.5}Sr_{0.5}Co_{1.5}Fe_{0.5}O_{5+\delta}$); a single perovskite material, such as $Sm_{1-x}Sr_xCoO_{3-\delta}$ (SSC), $BaZr_{1-x-y-z}Co_xFe_yY_zO_{3-\delta}$; or $SrSc_xNd_yCo_{1-x-y}O_{3-\delta}$, wherein x, y, and z are dopant levels and $\delta$ is the oxygen deficit; a Ruddleson-Popper-type perovskite material, such as $M_2NiO_{4-\delta}$, wherein $\delta$ is the oxygen deficit and M is La, Pr, Gd, or Sm (e.g., $La_2NiO_{4-\delta}$, $Pr_2NiO_{4-\delta}$, $Gd_2NiO_{4-\delta}$, $Sm_2NiO_{4-\delta}$); a single perovskite/perovskite composite material such as SSC-BZCYYb, or a cermet material comprising at least one metal (e.g., Ni) and at least one perovskite, such as a nickel/perovskite cermet (Ni-perovskite) material (e.g., Ni—BZCYYb, NiO—BZCYYb, Ni—BSNYYb, Ni—$BaCeO_3$, Ni—$BaZrO_3$, Ni—$Ba_2(YSn)O_{5.5}$, Ni—$Ba_3(CaNb_2)O_9$). In some embodiments, the hydrogen electrode 310 is formed from NiO—$BaZr_{0.1}Ce_{0.7}Y_{0.2-x}Yb_xO_{3-\delta}$ and is porous.

The electrolyte 315 is configured and formulated to conduct $H^+$ from the 3D electrode 305 to the hydrogen electrode 310, while electrically insulating the hydrogen electrode 310 from the 3D electrode 305 and preventing the migration of gaseous materials (e.g., $O_2$ (g), $H_2O$ (g)) therethrough. The electrolyte 315 may be formed of any material formulated to exhibit an ionic conductivity (e.g., $H^+$ conductivity) greater than or equal to about $10^{-2}$ S/cm (e.g., within a range of from about $10^{-2}$ S/cm to about 1 S/cm) at one or more temperatures within a range of from about 150° C. to about 650° C. (e.g., from about 200° C. to about 600° C.). The material of the electrolyte 315 may include, but is not limited to, a perovskite material having an operational temperature (e.g., a temperature at which the $H^+$ conductivity of the perovskite material is greater than or equal to about $10^{-2}$ S/cm, such as within a range of from about $10^{-2}$ S/cm to about 1 S/cm) within a range of from about 350° C. to about 650° C., a solid acid material having an operational temperature (e.g., a temperature at which the $H^+$ conductivity of the solid acid material is greater than or equal to about $10^{-2}$ S/cm, such as within a range of from about $10^{-2}$ S/cm to about 1 S/cm) within a range of from about 200° C. to about 400° C., a polybenzimidazole (PBI) material having an operational temperature (e.g., a temperature at which the $H^+$ conductivity of the PBI material is greater than or equal to about $10^{-2}$ S/cm, such as within a range of from about $10^{-2}$ S/cm to about 1 S/cm) within a range of from about 150° C. to about 250° C., or combinations thereof. By way of non-limiting example, the perovskite material may be one or more of a yttrium- and ytterbium-doped barium-zirconate-cerate (BZCYYb), such as $BaZr_{0.8-y}Ce_yY_{0.2-x}Yb_xO_{3-\delta}$, wherein x and y are dopant levels and $\delta$ is the oxygen deficit (e.g., $BaZr_{0.3}Ce_{0.5}Y_{0.1}Yb_{0.1}O_{3-\delta}$); a yttrium- and ytterbium-doped barium-strontium-niobate (BSNYYb), such as $Ba_3(Sr_{1-x}Nb_{2-y}Y_xYb_y)O_{9-\delta}$, wherein x and y are dopant levels and $\delta$ is the oxygen deficit; doped barium-cerate ($BaCeO_3$)(e.g., yttrium-doped $BaCeO_3$ (BCY)); doped barium-zirconate ($BaZrO_3$) (e.g., yttrium-doped $BaCeO_3$ (BZY)); barium-yttrium-stannate ($Ba_2(YSn)O_{5.5}$); and barium-calcium-niobate ($Ba_3(CaNb_2)O_9$). By way of non-limiting example, the solid acid material may be a solid acid phosphate material, such as solid acid cesium dihydrogen phosphate ($CsH_2PO_4$). The solid acid material may be doped (e.g., doped $CsH_2PO_4$), or may be undoped (e.g., undoped $CsH_2PO_4$). By way of non-limiting example, the PBI material may be a doped polybenzimidazole (PBI) material, such as phosphoric acid ($H_3PO_4$) doped PBI. The electrolyte 315 may be, for example, a perovskite material. In some embodiments, the electrolyte 315 is formed from BZCYYb.

The 3D electrode 305 may be formed of one of the above-mentioned materials for the hydrogen electrode 310. Alternatively, the 3D electrode 305 may be formed of an oxygen ion-conducting oxide material (e.g., $Ba_{0.5}Sr_{0.5}Co_{0.8}Fe_{0.2}O_{3-\delta}$, BSCF and $PrBaCo_2O_{5+\delta}$, PBCO), a triple-conducting oxide (TCO) material (e.g., $PrBa_{0.5}Sr_{0.5}Co_{2-x}Fe_xO_{5+\delta}$ (PBSCF), $NdBa_{0.5}Sr_{0.5}Co_{1.5}Fe_{0.5}O_{5+\delta}$ (NBSCF)), or combinations thereof. The TCO material may exhibit oxygen ion and proton conductivities. However, other materials may also be used. In some embodiments, the 3D electrode 305 is formed from $PrBa_{0.5}Sr_{0.5}Co_{2-x}Fe_xO_{5+\delta}$. The 3D electrode 305 is configured from the 3D architectured material 100 according to embodiments of the disclosure.

The hydrogen electrode 310 and the electrolyte 315 of the electrochemical cell 300 (e.g., SOEC) may be produced by conventional techniques including, but not limited to, a rolling process, milling process, shaping process, pressing process, consolidation process, etc.), which are not described in detail herein. The electrochemical cell 300 may be mono-faced or bi-faced and may have a prismatic, folded, wound, cylindrical, or jelly rolled configuration. The 3D electrode 305 is formed according to embodiments of the disclosure.

Figure 4:
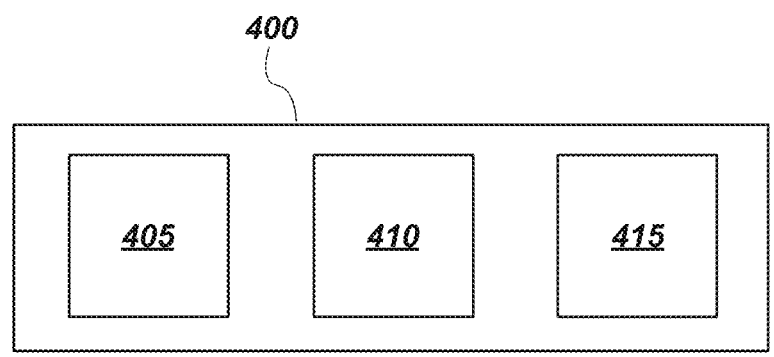
FIG. 4 is a schematic illustration of a system including the electrochemical cell including the 3D architectured material according to embodiments of the disclosure.

A system 400 including the electrochemical cell 300 (e.g., SOEC) is also disclosed, as shown in FIG. 4. The system 400 is a $H_2$ gas production system and includes at least one steam generator 405 and at least one electrolysis apparatus 410 in fluid communication with the steam generator. The electrolysis apparatus 410 includes a housing structure, and at least one electrochemical cell 300 contained within the housing structure. The electrochemical cell 300 is electrically connected (e.g., coupled) to a power source 415, and includes the 3D electrode 305 (e.g., the steam electrode), a negative electrode (e.g., the hydrogen electrode 310), and the electrolyte 315 between the 3D electrode 305 and the hydrogen electrode 310. The system 400, such as the $H_2$ production system, may optionally include at least one heating apparatus (not shown) operatively associated with the electrolysis apparatus 410. The system 400 may, in some embodiments, be a proton-conducting SOEC (P-SOEC). The steam generator 405, the electrolysis apparatus 410, the housing structure, and the power source are conventional and, therefore, are not described in detail herein. In some embodiments, the electrochemical cell 300 includes $BaZr_{0.1}Ce_{0.7}Y_{0.2-x}Yb_xO_{3-\delta}$ as the material of the electrolyte 315, $PrBa_{0.5}Sr_{0.5}Co_{2-x}Fe_xO_{5+\delta}$ as the material of the 3D electrode 305, and $NiO\text{—}BaZr_{0.1}Ce_{0.7}Y_{0.2-x}Yb_xO_{3-\delta}$ as the material of the hydrogen electrode 310.

During use and operation, the system 400 directs a gaseous $H_2O$ stream into the electrolysis apparatus 410 to interact with the 3D electrode 305 (e.g., the steam electrode) of the electrochemical cell 300. The water is introduced into the system 400 and contacts the electrochemical cell 300. A potential difference (e.g., voltage) is applied between the 3D electrode 305 and the hydrogen electrode 310 of the electrochemical cell 300 by the power source 415 so that as the gaseous $H_2O$ interacts with the 3D electrode 305, H atoms of the gaseous $H_2O$ release their electrons ($e^-$) to generate $O_2$ (g), hydrogen ions ($H^+$) (i.e., protons), and electrons ($e^-$) according to the following equation:

$$2H_2O(g) \rightarrow O_2(g) + 4H^+ + 4e^- \quad (1).$$

The generated hydrogen ions ($H^+$) permeate (e.g., diffuse) across the electrolyte 315 to the hydrogen electrode 310, the generated electrons ($e^-$) are directed to the power source 415 through external circuitry, and the generated $O_2$ (g) exits the electrolysis apparatus 410 as a gaseous $O_2$ stream. At the hydrogen electrode 310, the generated hydrogen ions exiting the electrolyte 315 react with the electrons received from the power source 415 to form H atoms, which then combine to form $H_2$ (g), according to the following equation:

$$4H^+ + 4e^- \rightarrow 2H_2(g) \quad (2).$$

The $H_{2(g)}$ then exits the electrolysis apparatus 410 as a $H_2$ (g) stream. The oxygen gas and the hydrogen gas may be recovered from the electrolysis apparatus 410 and used as feed streams in various industrial processes. By way of example only, the hydrogen gas may be used as a fuel. However, other uses of the hydrogen gas and the oxygen gas are contemplated.

The system 400 produces hydrogen by the decomposition (e.g., splitting) of water (e.g., steam) into oxygen gas and hydrogen gas through the application of electric current to the water across the 3D electrode 305 and the hydrogen electrode 310 of opposite polarity. Electrical current is applied to the steam across the electrodes 305, 310 of the electrochemical cell 300 at a temperature of less than or equal to about 600° C. to decompose (e.g., split) the steam into $H_2$ (g) and oxygen gas ($O_2$ (g)). The temperature may be less than or equal to about 550° C., less than or equal to about 500° C., less than or equal to about 450° C., or less than or equal to about 400° C. In some embodiments, the temperature is between about 500° C. and about 600° C.

The 3D electrode 305 for the electrochemical cell 300 (e.g., the fuel cell, the SOEC) may provide sufficient pathways for both electron/proton and gas diffusion, as well as a high surface area for better catalytic reaction activity. Without being bound by any theory, the morphology and porosity of the 3D electrode 305 are believed to contribute to the electrochemical performance. Using the 3D architectured material 100 in the 3D electrode 305, such as in the 3D steam electrode of the electrochemical cell 300, enables the electrolysis reaction to be conducted at a lower temperature, such as at a temperature of about 600° C. or lower, about 550° C. or lower, about 500° C. or lower, about 450° C. or lower, or about 400° C. or lower. In some embodiments, the electrolysis reaction is conducted at a temperature of from about 500° C. to about 600° C. Without being bound by any theory, it is believed that the hollow fibers 110 of the 3D architectured material 100 enable mass transfer of molecules, such as water molecules, through the fibers 110 at operating temperatures of about 600° C. or lower. In comparison, using conventional materials and configurations for the 3D electrode 305 require the electrolysis reaction to be conducted at a temperature of greater than about 800° C. to achieve efficient hydrogen production.

The following examples serve to explain embodiments of the disclosure in more detail. These examples are not to be construed as being exhaustive or exclusive as to the scope of the disclosure.

EXAMPLES

Example 1

BZCYYb and PBSCF Synthesis $BaZr_{0.1}Ce_{0.7}Y_{0.1}Yb_{0.1}O_{3-\delta}$ (BZCYYb) powder used for the electrolyte 315 of the electrochemical cell 300 and the hydrogen electrode 310 of the electrochemical cell 300 was prepared by solid state reaction from stoichiometric precursors barium carbonate (Sigma Aldrich, ≥99%, $BaCO_3$), zirconium oxide (Alfa Aesar, 99%, $ZrO_2$), cerium(IV) oxide (Aldrich, 99.9%, $CeO_2$), yttrium(III) oxide (Alfa Aesar, 99.99%, $Y_2O_3$), and ytterbium(III) oxide (Alfa Aesar, 99.9%, $Yb_2O_3$). The powders were ball-milled for 24 hours in ethanol, dried for 24 hours, crushed, and calcined at 1100° C. for 10 hours. The process was repeated to achieve the pure perovskite phase.

The $PrBa_{0.5}Sr_{0.5}Co_{1.5}Fe_{0.5}O_{5+\delta}$ (PBSCF) used for the 3D electrode 305 of the electrochemical cell 300 was synthesized by a glycine-nitrate process (GNP). Stoichiometric amounts of $Pr(NO_3)_3 \cdot 6H_2O$ (Alfa Aesar, 99.9%, metal basis), $Ba(NO_3)_2$ (Alfa Aesar, 99.95%), $Sr(NO_3)_2$ (Alfa Aesar, 99.97%), $Co(NO_3)_2 \cdot 6H_2O$ (Aldrich, 98+%), and $Fe(NO_3)_3 \cdot 9H_2O$ (Alfa Aesar, 98+%) were dissolved in distilled water with an appropriate amount of glycine. The solution was heated to 350° C. in air and followed by combustion to form fine powders, which were calcined at 600° C. for 4 hours. The resulting powders were then ground and calcined again at 900° C. for 4 hours.

Example 2

Electrochemical Half Cell Fabrication

Button cells with a configuration of NiO—BZCYYb|BZCYYb were fabricated by conventional techniques. First, a mixture of NiO (Alfa Aesar) and BZCYYb (powder (weight ratio of 60:40) was mixed in ethanol and toluene using a high-energy ball mill (SPEX, 8000M) for 20 minutes. Plasticizers and binders were added and then mixed for another 20 minutes to obtain a slip, which was degassed and tape-casted to form green tape. After drying overnight, the green tape was punched into wafers (12.7 mm in diameter), followed by pre-firing at 950° C. for 2 hours, forming NiO-BZCYYb anode supports (about 0.3 mm thick). Second, a thin layer of BZCYYb (about 10 μm) (produced as described in Example 1) was deposited on the NiO—BZCYYb anode by a slurry coating process followed by co-firing at 1400° C. for 4 hours to form the final half cell.

Example 3

Fabrication of a 3D Electrode

A 3D architectured material 100 was fabricated from PBSCF (produced as described in Example 1) through a template-derived and self-architectured procedure as shown in FIGS. 2a1-2d2 and 5a-5c. A PBSCF precursor solution 200 was prepared by dissolving a stoichiometric amount of $Co(NO_3)_2 \cdot 6H_2O$ (Sigma Aldrich), $Pr(NO_3)_3 \cdot 6H_2O$ (Sigma Aldrich), $Fe(NO_3)_3 \cdot 9H_2O$ (Sigma Aldrich), $Ba(NO_3)_2$ (Sigma Aldrich), and $Sr(NO_3)_2 \cdot 6H_2O$ (Sigma Aldrich) in distilled water, as described in Example 1. A fabric textile 205 (Telio, Montreal, CAN), as shown in FIGS. 2a1, 2a2, and 5a, was immersed in the PBSCF precursor solution 200 overnight, as shown in FIGS. 2b1, 2b2, followed by firing at 750° C. for 4 hours with a heating rate of 1° C.·min$^{-1}$ to form a sintered ceramic textile 215, as shown in FIGS. 2c1, 2c2, and 5a.

Figure 5C:
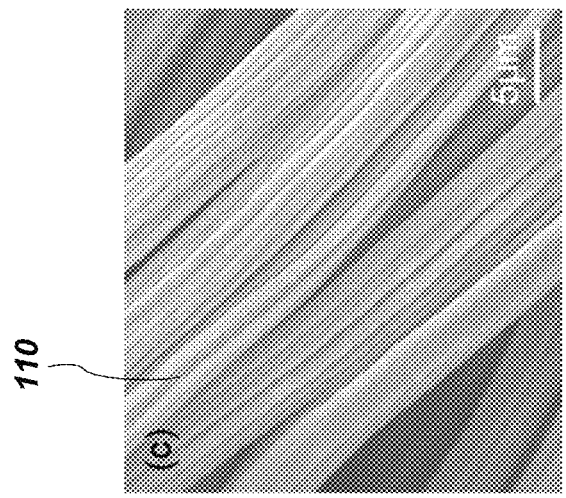
FIGS. 5a-5c include a photograph and SEM images of a fabric textile and a ceramic textile according to embodiments of the disclosure.
Figure 5B:
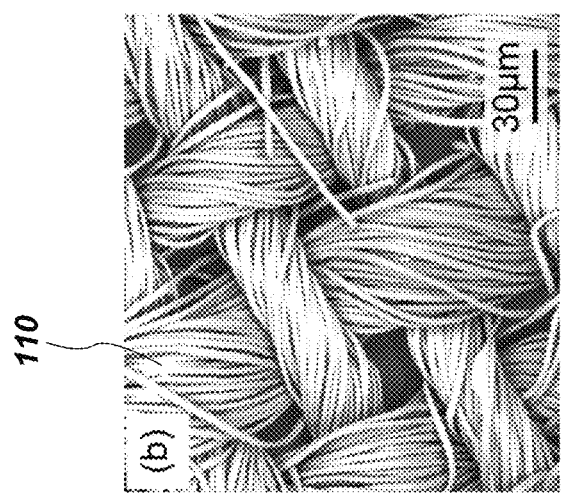
Figure 5A:
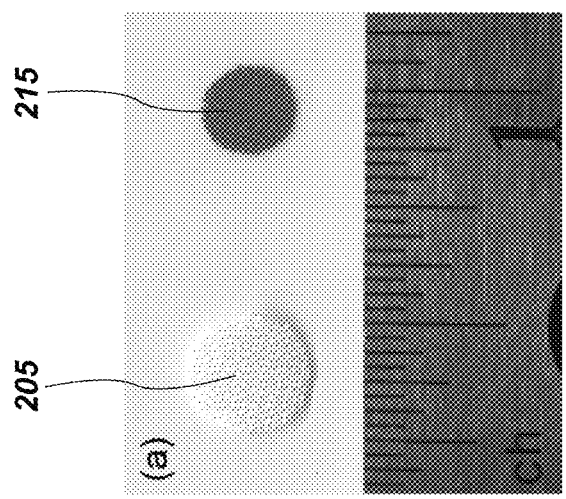

The microstructure of the original fabric textile 205 was characterized by SEM as shown in FIGS. 5a-5c. FIG. 5a is a photograph of the original fabric textile 205 and of the sintered ceramic textile 215. FIG. 5b shows a top view of the original fabric textile 205 and FIG. 5c shows a magnified image of fibers 110 of the original fabric textile 205. Coupons with a diameter of 3/16 inch (4.76 mm) were formed from the sintered ceramic textile 215, as shown in FIGS. 2c1, 2c2, and 5a. The sintered ceramic textile 215 included the 3D architectured PBSCF material 100 configured as the 3D electrode 305.

Example 4

Characterization of the 3D Electrode

The microstructure of the 3D electrode 305 formed from the 3D architectured PBSCF material 100 (produced as described in Example 3), as well as cell cross-sectional view, were characterized both via SEM (JEOL 6700F) with back scattering electron (BSE) analyzer and 3D X-ray microscopy. Transmission electron microscope (TEM) equipped with energy dispersive X-ray spectroscopy (JEOL 4000 EX) was also used to investigate the element distribution of the ceramic fibers. FIG. 1a shows the fibers 110 of the 3D architectured PBSCF material 100, after calcination. FIG. 1b, which is an enlarged view of the 3D architectured PBSCF material 100 in FIG. 1a, shows that the fibers 110 include uniformly (e.g., evenly) distributed pores 120 in the fiber walls 130. As shown in FIG. 1c, which is a cross-sectional view of the fibers 110, the fibers 110 of the 3D architectured PBSCF material 100 included the openings 125 and are hollow, with an average inner diameter of the openings 125 of from about 1 μm to about 2 μm. A portion of a single fiber 110 is shown in FIG. 1d by high-angle HAADF STEM. EELS mapping of the area marked in FIG. 1d showed that all of the elements (e.g., Pr, Ba, Sr, Co, Fe) of the 3D architectured PBSCF material 100 were relatively uniformly distributed.

Example 5

Characterization of BZCYYb Powders and PBSCF Textile

Figure 6:
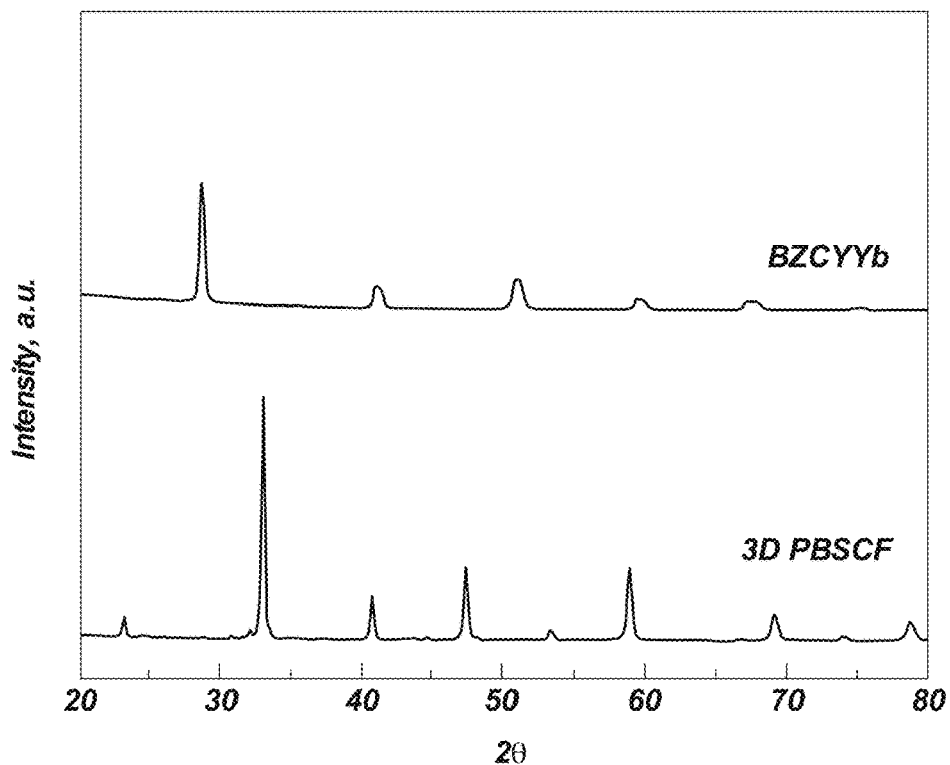
FIG. 6 shows x-ray diffraction (XRD) spectra of a yttrium- and ytterbium-doped barium-zirconate-cerate (BZCYYb) powder and a 3D $PrBa_{0.5}Sr_{0.5}Co_{1.5}Fe_{0.5}O_{5+\delta}$ (PBSCF) textile according to embodiments of the disclosure.

The phase purity of the BZCYYb powders and PBSCF textile described in Examples 1 and 3 above were examined with a Rigaku SmartLab X-Ray Diffraction (XRD) in 15-90° angular range with 0.04° step size and a 1.6 s resonance time. The XRD patterns are shown in FIG. 6 and indicate that the fibers 110 were well synthesized with no secondary phase.

Example 6

Electrolysis Cell Assembly

A coupon of sintered ceramic textile 215 was then bonded, as shown in FIGS. 2d1 and 2d2, on the top of the NiO—BZCYYb/BZCYYb half cell (described in Example 2) by using 10 wt % polyvinyl butyral (PVB)/PBSCF suspension (5 wt % PBSCF powders and 5 wt % PVB in ethanol) with a loading of 30 mL cm$^{-2}$, followed by co-firing at 750° C. for 2 hours to form a full cell (i.e., the electrochemical cell 300) including the 3D architectured PBSCF material 100 configured as the 3D electrode 305. The sintered ceramic textile 215 coupon exhibited sufficient mechanical strength and flexibility to be processed and integrated into the electrochemical cell 300 (e.g., the SOEC). The SOEC included the 3D architectured PBSCF material 100 configured as the 3D electrode 305, BZCYYb as the electrolyte 315, and Ni-BZCYYb as the hydrogen electrode 310.

Example 7

Characterization of the SOEC

Figure 7:
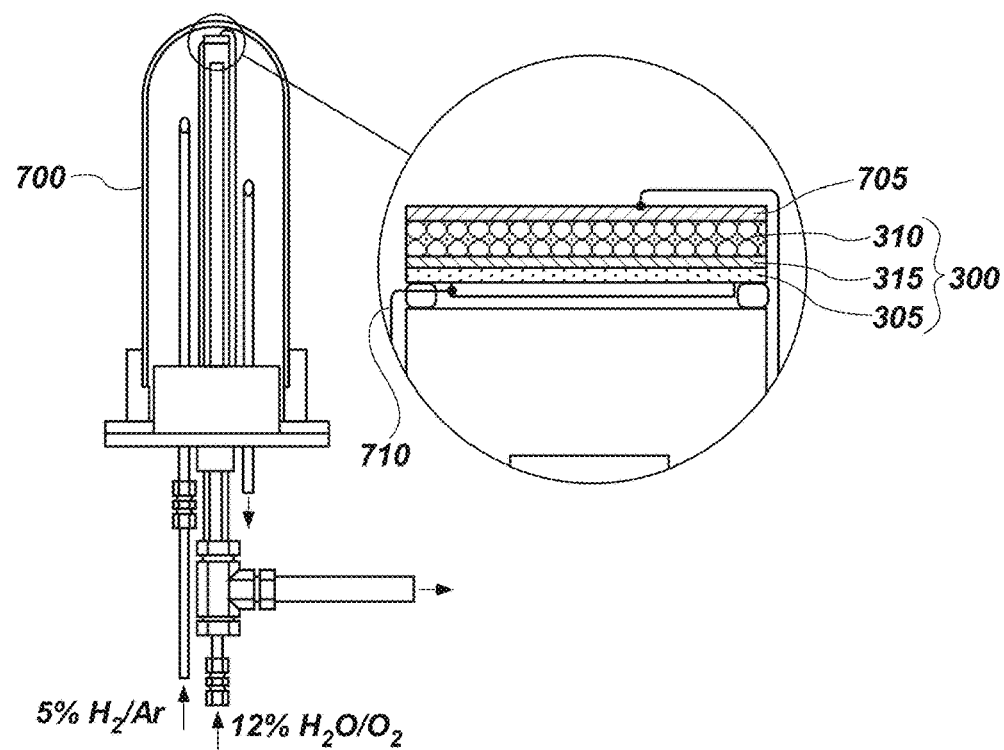
FIG. 7 is a schematic of a testing apparatus including the 3D architectured material according to embodiments of the disclosure.

The SOEC (i.e., the electrochemical cell 300) included the 3D architectured PBSCF material 100 as the 3D electrode 305, BZCYYb as the electrolyte 315, and Ni—BZCYYb as the hydrogen electrode 310 as described in Examples 5 and 6. The electrochemical cell 300 was then sealed in a reactor 700, as shown in FIG. 7, using a glass sealant (Schott, Germany), with the 3D electrode 305 side up. The reactor 700 is a testing apparatus. However, in actual use and operation, the system 400 may adopt other configurations. Metal-containing mesh 705 and wire 710 (such as platinum mesh and silver wire or silver mesh and platinum wire) were used as the current collector and leads, respectively. After assembly, the electrochemical cell 300 was heated up to 600° C. with a ramping rate of 1° C. min$^{-1}$. Oxygen (30 ml min$^{-1}$) was used in the 3D electrode 305 side at the ramping step while pure hydrogen, with a flow rate of 10 mL min$^{-1}$, was fed into the hydrogen electrode 310 side to reduce NiO into metallic Ni when the temperature reached 600° C. After full reduction, pure $O_2$ was introduced into the 3D electrode 305 after going through a bubbler at a temperature of 50° C. The steam partial pressure at the 3D electrode 305 side was maintained at 12% (50° C.) with a constant $O_2$ flow rate of 100 ml min$^{-1}$. In the hydrogen electrode 310, pure hydrogen was switched to 3% hydrogen in Ar as the sweeping gas. The steam electrolysis process started when a fixed current density was applied. The corresponding voltage was recorded over time using a Solartron 1400 electrochemical working station. Gas compositions at the hydrogen electrode 310 side were analyzed using gas chromatography (GC, Shimadzu 2010 plus) at open circle voltage as well as at the different current densities to investigate the Faraday efficiency.

Figure 8A:
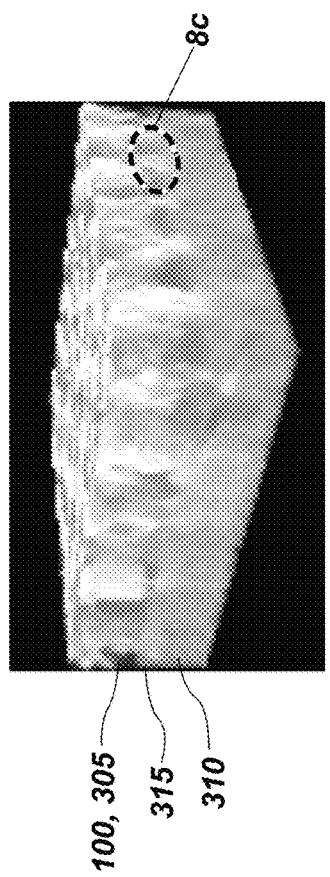
FIGS. 8a and 8b are 3D X-ray microscopy images of an electrochemical cell including the 3D architectured material according to embodiments of the disclosure as a 3D electrode before (FIG. 8a) and after (FIG. 8b) steam electrolysis.
Figure 8B:
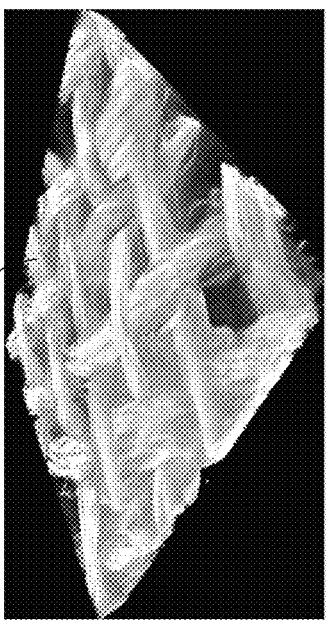
Figure 8C:
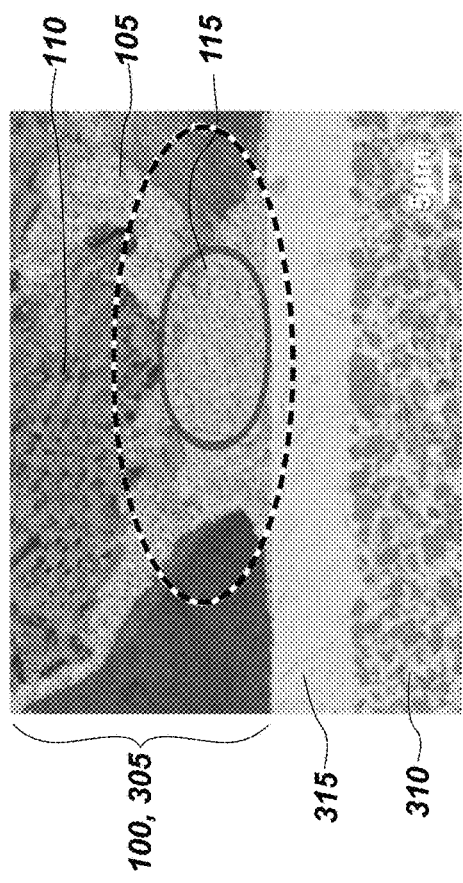
FIG. 8c is an SEM image showing a cross-sectional view of the circled portion of the electrochemical cell from FIG. 8a, and FIG. 8d is a reconstructed 3D microscopy image of the electrochemical cell.
Figure 8D:
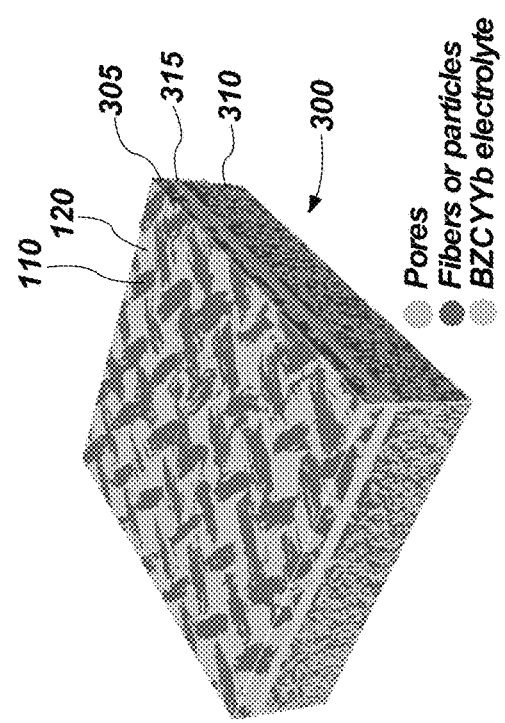

The SOEC microstructure, especially the interface between the 3D electrode 305 formed from the 3D architectured PBSCF material 100 and the BZCYYb electrolyte 315, were characterized by X-ray microscopy, reconstructed 3D microscopy, and SEM. The images of the SOEC were taken before electrochemical testing and demonstrated the initial morphology of the components of the SOEC. FIG. 8a shows the 3D X-ray microscopic image of the 3D electrode 305 (top), electrolyte 315 (middle) and hydrogen electrode 310 (bottom) tri-layer with a dimension of 0.6×0.6×0.2 mm$^3$. The BZCYYb electrolyte 315 was hard to distinguish in this microscopic image due to the limited thickness (10 μm) compared with the overall large scale of the SOEC. Interface contacts between the 3D electrode 305 formed from the 3D architectured PBSCF material 100 and the electrolyte 315 were clearly observed, which is crucial to electrode bonding as well as charge transfer. Moreover, the bulk fiber frame presented no cracks or disconnections after application on the electrolyte 315, as shown in FIG. 8b. The cross-sectional SEM image showing the interface contact between the electrodes 305, 310 and the electrolyte 315 before electrolysis is presented in FIG. 8c. Both the 3D electrode 305 and the porous hydrogen electrode 310 were well adhered to the dense BZCYYb electrolyte 315, forming delicate interfaces between the electrolyte 315 and the electrodes 305, 310. Clear interface contacts between the 3D electrode 305 and BZCYYb electrolyte 315 were observed both in X-ray microscopy (FIG. 8a) and SEM (FIG. 8c). These solid contacts included PBSCF particles (i.e., the metal oxide particles 115 (within circled regions)) from the PVB/PBSCF suspension used in the bonding process, which moved under the force of gravity through the frame gaps to the interface to form a pier-like conjunction. To further study the 3D electrode 305 porosity, a 3D microstructure was reconstructed by directly stacking the raw X-ray images along the x-axis in sequence. The reconstructed image is shown in FIG. 8d and has a dimension of 0.4×0.4×0.1 mm$^3$. The porosity of the 3D electrode 305 formed from the 3D architectured PBSCF material 100 was 57.7%, which was obtained as the number fraction of pore pixels in the 2D slice. The porosity is much higher than conventional hierarchically oriented macroporous electrodes, which exhibited a porosity of about 42%, as discussed in Chen et al., *ACS Appl. Mater. Interfaces* 2014, 6, 5130-5136. Without being bound to any theory, the ultra large porosity is believed to benefit the fast steam transfer within the 3D electrode 305 and subsequently enhance the steam electrolysis performance. Because the size of water molecules (about 275 pm) is larger than that of $O_2$ molecule (about 150 pm), the 3D electrode 305 utilizes more porosity than the hydrogen electrode 310 for mass transfer.

Example 8

Electrochemical Cell Performance

The electrochemical cell 300 (e.g., the SOEC) described in Example 6 demonstrated excellent efficiency and durability in steam electrolysis below 600° C. The electrochemical tests were performed in 5% $H_2$-95% Ar as the hydrogen electrode purge gas and 12% $H_2O$-88% $O_2$ as the steam electrode inlet gas.

Figure 9A:
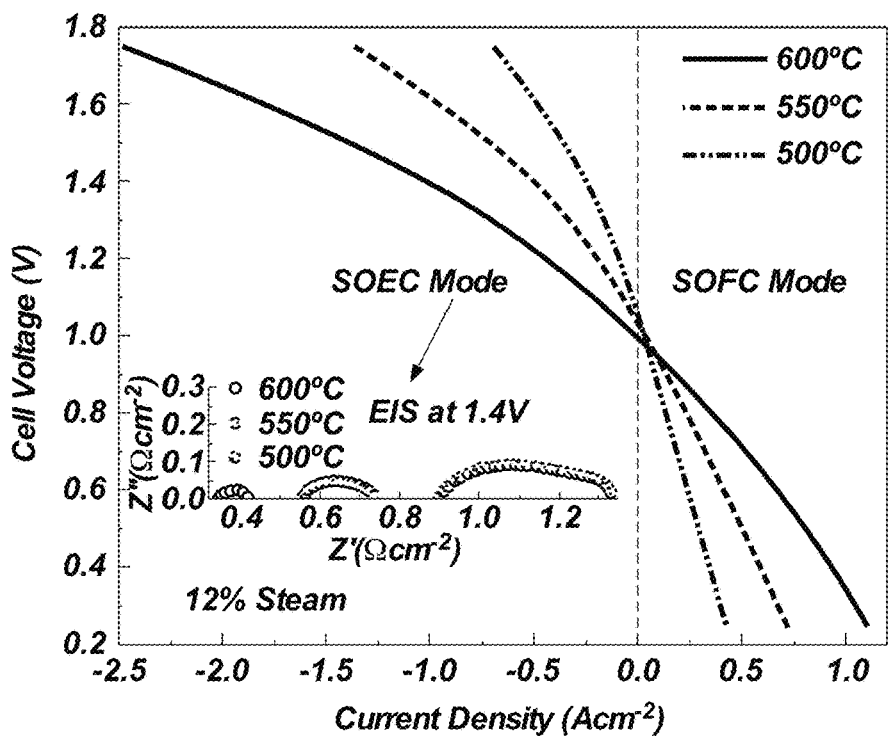
FIGS. 9a-9d are graphs illustrating performance of an electrochemical cell including the 3D architectured material to embodiments of the disclosure as a 3D electrode.

Electrochemical testing of the electrochemical cell 300 described above was performed at a temperature range of from about 500° C. to about 600° C. (at 500° C., 550° C., and 600° C.) with a steam partial pressure of 12%, which was obtained by setting the temperature of the inlet carrying gas bubbler to 50° C. The voltage-current characteristics of the electrochemical cell 300 in both SOFC and SOEC mode were recorded when pure $H_2$ was introduced into the hydrogen electrode 310, as shown in FIG. 9a. The positive current density refers to fuel cell (SOFC) operation while the negative current density refers to electrolysis cell (SOEC) operation. Cell potential values at zero current density correspond to the open circuit voltages (OCV). The OCVs of the electrochemical cell 300 were 0.99 V, 1.02 V, and 1.04 V at 600° C., 550° C., and 500° C., respectively, which were slightly lower than the OCV values at 3% steam partial pressure that were reported previously by Wu et al., *ECS Trans.* 2017, 80, 167-173. The OCV difference came from the lower oxygen partial pressure when the steam ratio increased from 3% to 12%. In SOFC mode, the slope of the I-V curve increased with a decrease in operating temperature, which indicated that the Ohmic resistance of the electrochemical cell 300 increased. The area specific resistances (ASRs) of the electrochemical cell 300 in SOFC mode was calculated from the slope of the I-V curves with the section of potential between 0.3 V and 0.8 V where the I-V curve presented linearly. The ASRs of the electrochemical cell 300 in SOFC mode were approximately 0.72 Ωcm$^2$, 1.13 Ωcm$^2$, and 1.86 Ωcm$^2$ at 600° C., 550° C., and 500° C., respectively. When the SOFC was operated at a 0.7 V, the current densities were 0.52 Acm$^{-2}$, 0.32 Acm$^{-2}$, and 0.13 Acm$^{-2}$ with power densities of 0.36 Wcm$^{-2}$, 0.22 Wcm$^{-2}$, and 0.09 Wcm$^{-2}$ at 600° C., 550° C., and 500° C., respectively. The performance in SOFC mode was reasonable and even 1.6 times of the peak power density of a Ni—BZCYYb anode supported fuel cell with a $BaCo_{0.4}Fe_{0.4}Zr_{0.2}O_{3-\delta}$ cathode. While in SOEC mode, the steam electrolysis performance demonstrated the same trend as the performance change in SOFC mode. When the electrochemical cell 300 was operated at a potential of 1.6 V, the electrolysis current densities were −2.02 A cm$^{-2}$, −1.08 A cm$^{-2}$, and −0.54 A cm$^{-2}$ at 600° C., 550° C., and 500° C., respectively. Thus, the 3D electrode 305 functioned as an efficient H—SOEC at a temperature below 600° C.

The steam electrolysis performance at 500° C. according to embodiments of the disclosure was even better than that of a P—SOEC at 700° C. reported by Gan et al., *RSC Adv.* 2016, 6, 641-647, as well as the electrolysis performance of a GDC based O—SOEC reported by Heidari et al., *Energy Convers. Manage.* 2017, 136, 78-84. According to the inserted EIS results in FIG. 9a, the Ohmic ASRs at 1.4 V are 0.34 Ωcm$^2$, 0.55 Ωcm$^2$, and 0.9 Ωcm$^2$ for 600° C., 550° C., and 500° C., respectively, which were significantly lower than that obtained in SOFC mode with similar cell configuration. Without being bound by any theory, it is believed that the presence of water led to the formation of more protonic defects in the oxygen-deficient perovskite electrolyte 315 and, thus, increased its conductivity.

Figure 9B:
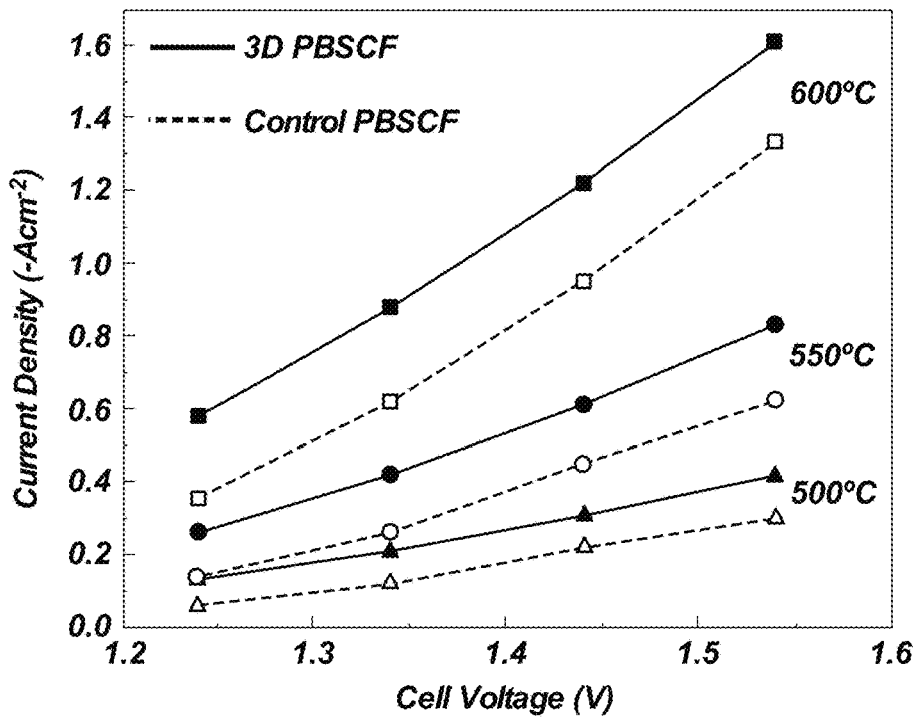
Figure 9C:
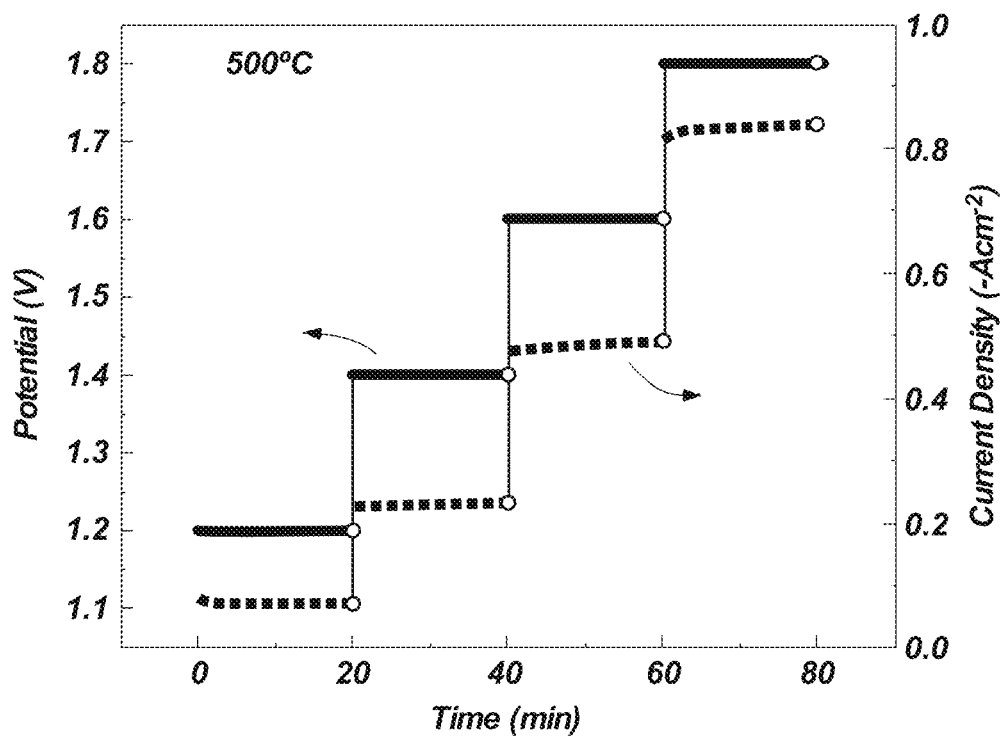

FIG. 9b compares the electrolysis performances between SOECs with a control (not 3D) PBSCF electrode and the 3D electrode 305 formed from the 3D architectured PBSCF material 100 according to embodiments of the disclosure at different temperatures (500° C., 550° C., and 600° C.). The control PBSCF electrode included the PBSCF material in a conventional (not 3-dimensional) electrode configuration fabricated by conventional mechanical mixing, screen printing, and firing processes. At each operating temperature, the current densities of the electrochemical cell 300 (e.g., the SOEC) with the 3D electrode 305 at different applied voltages were much higher than those of the SOEC with the control PBSCF electrode, which indicated an improvement of electrolysis performance using the 3D electrode 305 according to embodiments of the disclosure. FIG. 9c presents the electrolysis step test at different applied voltages of 1.2 V, 1.4, V, 1.6 V, and 1.8 V at 500° C. A current density of approximately 0.5 A cm$^{-2}$ was observed at 1.6 V, which is in good accordance with that in FIG. 9a. At each stage, the electrolysis current was stable at low applied voltage and kept increasing at a higher one, presenting an "activation" process. This is evidenced by the observation that the current density stayed the same at 1.4 V while the electrochemical cell 300 was changed from −0.79 Acm$^{-2}$ to −0.83 Acm$^{-2}$ at 2 V. The relevant Faraday efficiency at each applied voltage was calculated and is listed in Table 1.

TABLE 1

Faraday efficiency at different applied voltages at 500° C.

| Applied voltage/V | 1.2 | 1.4 | 1.6 | 1.8 |
|---|---|---|---|---|
| Current density/Acm$^{-2}$ | 0.07 | 0.23 | 0.49 | 0.84 |
| Faraday efficiency/% | 99.6 | 98.4 | 98.0 | 97.5 |

According to Faraday's law, the theoretical hydrogen production rate (100% Faraday efficiency) converted from the electronic balance and equivalent hydrogen production flow rate can be defined as follows:

$$\dot{V} = \frac{I}{2F} \times V_m \times t \quad (2)$$

where $\dot{V}$ is the theoretical hydrogen production flow rate (standard cubic centimeter per minute, sccm), I is the input current (A), 2 is the number of electrons involved in the steam electrolysis reaction, F is the Faraday constant, and $V_m$ is the molar volume of a gas (22400 mL mol$^{-1}$). The experimental hydrogen production flow rate $V_e$ was obtained by analyzing the gas composition of the hydrogen electrode 310 exhaust using gas chromatography. Therefore, the Faraday efficiency η could be defined as follows:

$$\eta = \frac{V_e}{\dot{V}} \quad (3)$$

For example, the experimental hydrogen production at 1.6 V was measured as 0.596 sccm at 500° C., with a corresponding current density of 0.49 Acm$^{-2}$. However, $\dot{V}$ for a SOEC operated at an electrolysis current density of 0.49 A cm$^{-2}$ was calculated to be approximately 0.608 sccm, which equaled a Faraday efficiency of 98.0% at this applied electrolysis voltage at 500° C. As shown in Table 1, the steam electrolysis Faraday efficiency decreased from 99.6% to 97.5% when the current density increased from 1.2 V to 1.8 V at 500° C. The Faraday efficiency decrease at higher current densities is believed to occur for two reasons. One is the larger amount of heat generated from SOEC internal resistance than that required for water decomposition at high current densities because of increasing operating voltage. Another possible reason for the efficiency loss at higher current density may be the electronic or hole conduction, since the proton-conducting oxides (e.g., the metal oxides of the metal oxide particles 115) are not unity at high voltage. However, all the Faraday efficiencies at electrolysis voltages up to 1.8 V were close to the theoretical 100%, which indicated the current leakage through the BZCYYb electrolyte 315 was negligible at 500° C.

Figure 9D:
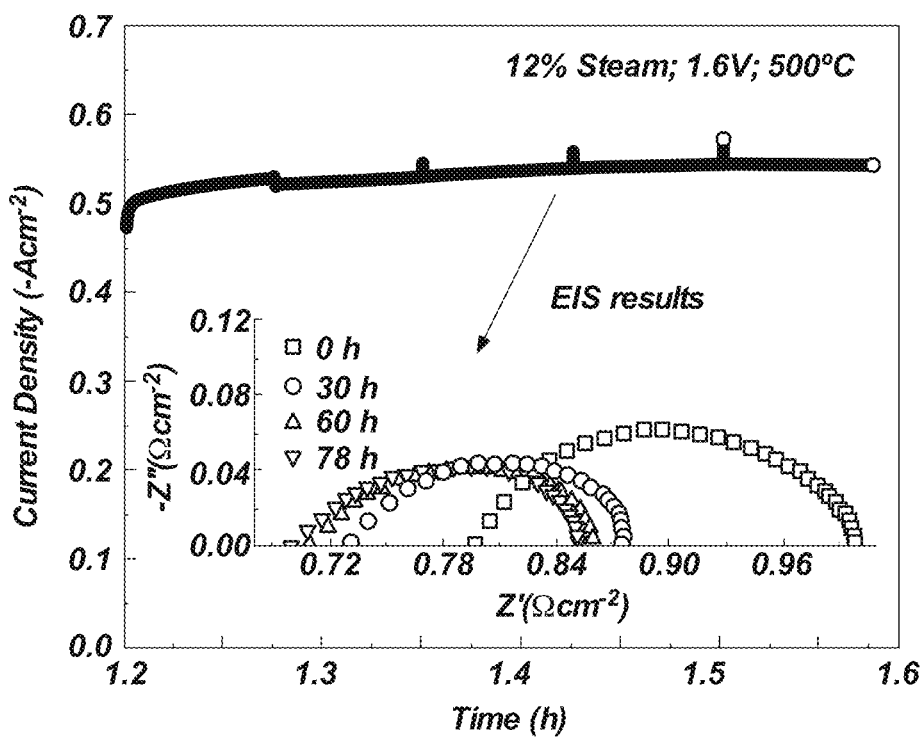

During a long-term durability test, as shown in FIG. 9d, the SOEC was operated at a constant electrolysis voltage of 1.6 V for 78 hours at 500° C. The inserted EIS results were acquired every 15 hours at a voltage of 1.6 V. H$_2$ and 12% H$_2$O-88% O$_2$ were used as the reacting gases in the hydrogen electrode 310 and 3D electrode 305, respectively. As shown in FIG. 9d, the electrolysis current presented no degradation during the entire 78-hour steam electrolysis process. Instead, the SOEC with the 3D electrode 305 was constantly "activated" over the time since the current density increased steadily, consistent with the step test (FIG. 9c). According to the EIS results, the cell total resistance presented a significant drop from 1.0 Ωcm$^2$ to 0.88 Ωcm$^2$ within the initial 15 hours and then gradually decreased to 0.85 Ωcm$^2$ after 75 hours. However, the polarization resistance of the electrochemical cell 300 remained the same during the durability test and was approximately 0.15 Ωcm$^2$. While the Ohmic resistance, which accounts for more than 80% of the electrochemical cell 300 total resistance, decreased from 0.79 Ωcm$^2$ to 0.69 Ωcm$^2$. It is reasonable to correlate the electrolysis performance "activation" to the decrease of the electrochemical cell 300 Ohmic resistance, which is believed to be associated with the reconstruction of the 3D electrode 305 microstructure during the electrolysis. Instead of fast degradation as observed with conventional O—SOECs, performance enhancement was observed during electrolysis at an applied voltage of 1.6 V at 500° C. for over 75 hours, attributed to a "bridging" effect originated from reconstruction of the 3D electrode 305. The H—SOEC with the 3D electrode 305 demonstrated excellent performance, promising a new prospective for next-generation steam electrolysis at reduced temperatures.

FIGS. 10a and 10b are cross-sectional images of the 3D electrode 305 taken near the interface between the 3D electrode 305 and the BZCYYb electrolyte 315 before and after steam electrolysis, respectively. The PBSCF particles (e.g., metal oxide particles 115 (within circled regions)) went through the electrode frame 105 and mainly stacked at the contact area between the 3D electrode 305 and the electrolyte 315 with the assistance of the suspension liquid. Limited connection was observed between the fibers 110 in the bulk frame. Visible gaps between interfacial contacts were also observed. After steam electrolysis, the fibers 110 were connected with the PBSCF particles and the previous PBSCF conjunction between the frame 105 and the electrolyte 315 became thinner, as shown in FIG. 10b. The gaps between interface contacts, demonstrated in FIG. 10a and FIG. 8c, disappeared after electrolysis with a uniform electrode 305, 310/electrolyte 315 interface. The interface reconstruction process was supposed to increase both the active reaction area and the electrolysis performance since the electrode 305, 310/electrolyte 315 interface is the key area to determine electrochemical cell 300 performances. It should be noted that micro-cracks or spallation were observed at the electrode 305, 310/electrolyte 315 interface, which may come from the SEM sample preparation since the 3D electrode 305 was brittle after long term electrolysis. FIGS. 10c and 10d are schematic illustrations that demonstrate the mechanism of microstructure variation before (FIG. 10c) and after (FIG. 10d) the steam electrolysis. A portion of the PBSCF particles (e.g., metal oxide particles 115 (within circled regions)) moved from the interface to the gaps between the fibers 110 of the electrode 305 and bridged them at the applied current and voltage during steam electrolysis. The improved contact between the fibers 110 is believed to decrease the Ohmic resistance since more electron/proton pathways were generated. Combined with the EIS results in FIGS. 9a and 9d, the bridging effect between electrode fibers as well as the interface reconstruction could be the reason for Ohmic resistance decrease and the performance activation.

A comparison of steam electrolysis performances (i.e., the electrolysis current densities at the applied voltage of 1.6 V) of conventional P—SOECs is shown in Table 2, which clearly depicts how the 3D electrode 305 according to embodiments of the disclosure provided improved performance relative to those previously reported.

TABLE 2

Comparison of steam electrolysis performance of an electrochemical cell including
the 3D electrode according to embodiments of the disclosure to the steam electrolysis
performances of conventional SOEC technologies at different temperature ranges.

| Electrolyte | Steam electrode | Hydrogen electrode | T/° C. | Steam ratio | Applied Voltage/V | Current/ Acm$^{-2}$ |
|---|---|---|---|---|---|---|
| BZCYYb | 3D-PBSCF | Ni-BZCYYb | 600 | 12% | 1.3 | 0.85 |
|  |  |  | 550 |  |  | 0.42 |
|  |  |  | 500 |  |  | 0.21 |
| BZCYYb | Regular PBSCF | Ni-BZCYYb | 600 | 12% | 1.3 | 0.55 |
| BaCe$_{0.5}$Zr$_{0.3}$Y$_{0.2}$O$_{3-\delta}$ (BCZY) | Sm$_{0.5}$Sr$_{0.5}$CoO$_3$-BZCY | Ni-BZCY | 600 | 50% | 1.5 | 0.33 |
| BZCYYb | NdBa$_{0.5}$Sr$_{0.5}$Co$_{1.5}$Fe$_{0.5}$O$_{5+\delta}$ | Ni-BZCYYb | 600 | 10% | 1.3 | 0.75 |
| BaCe$_{0.5}$Zr$_{0.3}$Y$_{0.16}$Zn$_{0.04}$O$_{3-\delta}$ (BCZYZ) | La$_{0.8}$Sr$_{0.2}$Mn$_{1-x}$Sc$_x$O$_{3-\delta}$ | La$_{0.75}$SR$_{0.25}$Cr$_{0.5}$Mn$_{0.5}$O$_{3-\delta}$ (LSCM) | 700 | 5% | 1.6 | 0.04 |
| BCZYZ | Fe$_2$O$_3$-LSM-BCZYZ | LSCM-BCZYZ | 800 | 5% | 1.6 | 0.07 |
| BCZYZ | LSCM-BCZYZ | Ni-BCZYZ | 700 | 3% | 1.3 | 0.78 |
| BaZr$_{0.9}$Y$_{0.1}$O$_{3-\delta}$ (BZY) | La$_{0.6}$Sr$_{0.4}$Co$_{0.2}$Fe$_{0.8}$O$_{3-\delta}$ (LSCF)-BZY | Ni-BZY | 600 | 3% | 1.3 | 0.05 |

At present, almost all SOECs are operated between 600° C. and 900° C. Using the 3D electrode 305 according to embodiments of the disclosure showed significant progress in decreasing the electrolysis temperatures compared with those O—SOECs that operate above 750° C. Among P—SOECs, which operate at reduced temperatures, the 3D electrode 305 according to embodiments of the disclosure demonstrated advantages toward steam electrode performance, which was reflected in the electrolysis current densities. For example, Bi et al., *J. Mater. Chem. A* 2015, 3, 5815-5819 reported a durable P-SOEC with current density of approximately 100 mAcm$^{-2}$ at 1.6 V, 600° C. The current density at the same temperature using the 3D electrode 305 according to embodiments of the disclosure reached more than 2 A cm$^{-2}$, which is almost 20 times of Bi's work. Gan et al., *J. Electrochem. Soc.* 2012, 159, F763-F767 reported a short-term stable proton-conducting solid oxide steam electrolyzer with a current density of 1.3 Acm$^{-2}$ at 1.6 V, 700° C. However, the Faraday efficiency is only 22% and the longer term durability test needs to be further evaluated.

Without being bound by any theory, the steam electrolysis performance enhancement according to embodiments of the disclosure is believed to be attributable to the improvement of proton-conducting electrolyte conductivity and the 3D framework of the 3D electrode 305 that offers more pathways for steam molecules to reach the active reaction zone. The significant expansion of triple phase boundaries through sufficient contacts among steam, electrode, and electrolyte is also believed to contribute to the performance enhancement. While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. An electrochemical cell, comprising:
   a three-dimensional (3D) electrode comprising a 3D architectured ceramic fabric textile comprising woven bundles of hollow fibers, the 3D electrode comprising an oxygen ion-conducting oxide material, a triple-conducting oxide material, a double perovskite material, a single perovskite material, a Ruddleson-Popper-type perovskite material, a single perovskite/perovskite composite material, a cermet material comprising at least one metal and at least one perovskite, or a combination thereof, distributed in the 3D architectured ceramic fabric textile;
   another electrode; and
   an electrolyte between the 3D electrode and the another electrode.

2. The electrochemical cell of claim 1, wherein the 3D electrode comprises a porous material.

3. The electrochemical cell of claim 1, wherein the 3D electrode comprising a 3D architectured ceramic fabric textile comprises the woven bundles of hollow fibers and metal oxide particles.

4. The electrochemical cell of claim 1, wherein the woven bundles of hollow fibers of the 3D electrode comprising a 3D architectured ceramic fabric textile include pores on sidewalls of the hollow fibers.

5. The electrochemical cell of claim 1, wherein the 3D electrode comprises a chemical formula of MBa$_{1-x}$Sr$_x$Co$_{2-y}$Fe$_y$O$_{5+\delta}$, wherein x and y are dopant levels, $\delta$ is an oxygen deficit, and M is praseodymium, neodymium, or samarium or a chemical formula of M$_2$NiO$_{4-\delta}$, wherein $\delta$ is the oxygen deficit and M is lanthanum, praseodymium, gadolinium, or samarium.

6. The electrochemical cell of claim 1, wherein the 3D electrode comprises Ba$_{0.5}$Sr$_{0.5}$Co$_{0.8}$Fe$_{0.2}$O$_{3-\delta}$, PrBaCo$_2$O$_{5+\delta}$, PrBa$_{0.5}$Sr$_{0.5}$Co$_{2-x}$Fe$_x$O$_{5+\delta}$, PrBa$_{0.5}$Sr$_{0.5}$Co$_{1.5}$Fe$_{0.5}$O$_{5+\delta}$, NdBa$_{0.5}$Sr$_{0.5}$Co$_{1.5}$Fe$_{0.5}$O$_{5+\delta}$, SmBa$_{0.5}$Sr$_{0.5}$Co$_{1.5}$Fe$_{0.5}$O$_{5+\delta}$, Sm$_{1-x}$Sr$_x$CoO$_{3-\delta}$, BaZr$_{1-x-y-z}$Co$_x$Fe$_y$Y$_z$O$_{3-\delta}$, SrSc$_x$Nd$_y$Co$_{1-x-y}$O$_{3-\delta}$, La$_2$NiO$_{4-\delta}$, Pr$_2$NiO$_{4-\delta}$, Gd$_2$NiO$_{4-\delta}$, Sm$_2$NiO$_{4-\delta}$, Sm$_{1-x}$Sr$_x$CoO$_{3-\delta}$-BZCYYb, Ni-BZCYYb, NiO-BZCYYb, NiO-BaZr$_{0.1}$Ce$_{0.7}$Y$_{0.2-x}$Yb$_x$O$_{3-\delta}$, Ni-BSNYYb, Ni-BaCeO$_3$, Ni- $BaZrO_3$, $Ni-Ba_2(YSn)O_{5.5}$, $Ni-Ba_3(CaNb_2)O_9$), or a combination thereof, wherein x, y, and z are dopant levels and δ is an oxygen deficit.

7. The electrochemical cell of claim 1, wherein the 3D electrode comprises $PrBa_{0.5}Sr_{0.5}Co_{1.5}Fe_{0.5}O_{5+\delta}$.

8. The electrochemical cell of claim 1, wherein at least one of the another electrode or the electrolyte comprises a yttrium-and ytterbium-doped barium-zirconate-cerate material.

9. The electrochemical cell of claim 8, wherein the another electrode further comprises nickel or nickel oxide.

10. The electrochemical cell of claim 1, wherein a diameter of the hollow fibers of the woven bundles of hollow fibers ranges from about 3 micrometers to about 4 micrometers.

11. The electrochemical cell of claim 1, wherein the woven bundles of hollow fibers exhibit pores distributed throughout walls of the woven bundles of hollow fibers.

12. A system, comprising:
at least one steam generator and at least one electrolysis apparatus in fluid communication with the at least one steam generator, the at least one electrolysis apparatus comprising at least one electrochemical cell and the at least one electrochemical cell comprising:
a three-dimensional (3D) electrode comprising a 3D architectured ceramic fabric textile comprising woven bundles of hollow fibers, the hollow fibers comprising openings with an average inner diameter of from about 0.5 micrometers to about 2.5 micrometers;
an electrolyte adjacent the 3D electrode; and
another electrode adjacent the electrolyte; and
a power source electrically connected to the at least one electrochemical cell.

13. The electrochemical cell of claim 12, wherein the 3D electrode is configured to produce oxygen ($O_2$) and the another electrode is configured to produce hydrogen gas ($H_2$) upon application of a voltage between the 3D electrode and the another electrode.

14. The system of claim 12, wherein the 3D architectured ceramic fabric textile comprising woven bundles of hollow fibers comprises a 3D architectured ceramic fabric textile comprising at least one metal oxide distributed in the 3D architectured ceramic fabric textile.

15. A method of forming hydrogen, comprising:
introducing water to an electrochemical cell comprising a three-dimensional (3D) electrode comprising a 3D architectured ceramic fabric textile comprising woven bundles of hollow fibers, the 3D electrode comprising an oxygen ion-conducting oxide material, a triple-conducting oxide material, a double perovskite material, a single perovskite material, a Ruddleson-Popper-type perovskite material, a single perovskite/perovskite composite material, a cermet material comprising at least one metal and at least one perovskite, or a combination thereof, distributed in the 3D architectured ceramic fabric textile; another electrode, and an electrolyte between the 3D electrode and the another electrode at a temperature of less than or equal to about 600° C.;
applying a potential difference between the 3D electrode and the another electrode; and
decomposing the water into oxygen gas and hydrogen gas.

16. The method of claim 15, wherein introducing water to an electrochemical cell at a temperature of less than or equal to about 600° C. comprises introducing the water to the electrochemical cell at a temperature of between about 500° C. and about 600° C.

17. The method of claim 15, wherein introducing water to an electrochemical cell at a temperature of less than or equal to about 600° C. comprises introducing the water at a temperature of between about 400° C. and about 600°° C.

18. The method of claim 15, further comprising recovering the oxygen gas and the hydrogen gas from the electrochemical cell.

19. The method of claim 15, wherein introducing water to an electrochemical cell comprising a 3D electrode comprising a 3D architectured ceramic fabric textile comprising woven bundles of hollow fibers comprises introducing the water to the electrochemical cell comprising the 3D electrode comprising the 3D architectured ceramic fabric textile comprising woven bundles of hollow fibers, the 3D electrode comprising one or more of the oxygen ion-conducting oxide material, the triple-conducting oxide material, the double perovskite material, the single perovskite material, the Ruddleson-Popper-type perovskite material, the single perovskite/perovskite composite material, and the cermet material comprising at least one metal and at least one perovskite, distributed in the 3D architectured ceramic fabric textile.

20. An electrochemical cell, comprising:
a three-dimensional (3D) electrode comprising a 3D architectured ceramic fabric textile comprising woven bundles of hollow fibers and having at least one metal oxide distributed in the 3D architectured ceramic fabric textile;
another electrode; and
an electrolyte between the 3D electrode and the another electrode.

* * * * *

UNITED STATES PATENT AND TRADEMARK OFFICE
CERTIFICATE OF CORRECTION

PATENT NO.       : 12,308,483 B2
APPLICATION NO.  : 16/980644
DATED            : May 20, 2025
INVENTOR(S)      : Wei Wu, Dong Ding and Ting He It is certified that error appears in the above-identified patent and that said Letters Patent is hereby corrected as shown below:

In the Specification

| | | |
|---|---|---|
| Column 5,  | Line 63,      | change "about 2.5 such" to --about 2.5 µm, such-- |
| Column 7,  | Line 56,      | change "$BaZr_{1-x-y-z}Co_xFe_yY_zO_{3-\delta}$); or" to --$BaZr_{1-x-y-z}Co_xFe_yY_zO_{3-\delta}$, or-- |
| Column 10, | Line 54,      | change "$Pr(NO_3)_3.6H_2O$" to --$Pr(NO_3)_3 \cdot 6H_2O$-- |
| Column 14, | Lines 28-29,  | change "$BaCo_{0.4}Fe_{0.4}Zr_{0.2}O_3$- δcathode." to --$BaCo_{0.4}Fe_{0.4}Zr_{0.2}O_{3-\delta}$ cathode.-- |
| Column 14, | Lines 40-41,  | change "*Energy Conyers. Manage.*" to --*Energy Convers. Manage.*-- |

In the Claims

| | | | |
|---|---|---|---|
| Claim 8,  | Column 19, | Line 8,  | change "yttrium-and ytterbium-doped" to --yttrium- and ytterbium-doped-- |
| Claim 17, | Column 20, | Line 21, | change "about 600°° C." to --about 600° C.-- |

Signed and Sealed this
Twenty-second Day of July, 2025

Coke Morgan Stewart
*Acting Director of the United States Patent and Trademark Office*